US012079584B2

(12) United States Patent
Dua et al.

(10) Patent No.: US 12,079,584 B2
(45) Date of Patent: Sep. 3, 2024

(54) SYSTEMS AND METHODS FOR CONVERSATION MODELING

(71) Applicant: PwC Product Sales LLC, New York, NY (US)

(72) Inventors: Suneet Dua, St. Petersburg, FL (US); Luis Beaumier, St. Petersburg, FL (US); Marc Nadeau, St. Petersburg, FL (US); Ryan Edley, Chicago, IL (US); Robert Coen, Tampa, FL (US); Jason Victor Randall, Dunedin, FL (US); Shannon M. Robinson, Memphis, TN (US)

(73) Assignee: PwC Product Sales LLC, New York, NY (US)

( * ) Notice: Subject to any disclaimer, the term of this patent is extended or adjusted under 35 U.S.C. 154(b) by 0 days.

(21) Appl. No.: 16/836,634

(22) Filed: Mar. 31, 2020

(65) Prior Publication Data

US 2021/0303801 A1    Sep. 30, 2021

(51) Int. Cl.
*G06F 40/40*    (2020.01)
*G06F 3/0482*   (2013.01)
(Continued)

(52) U.S. Cl.
CPC ............ *G06F 40/40* (2020.01); *G06F 3/0482* (2013.01); *G06F 3/16* (2013.01); *G06N 5/02* (2013.01); *G06F 3/0486* (2013.01)

(58) Field of Classification Search
None
See application file for complete search history.

(56) References Cited

U.S. PATENT DOCUMENTS

| 6,789,231 | B1 | 9/2004 | Reynar et al. |
| 7,685,252 | B1 * | 3/2010 | Maes ............. G06F 9/451 |
| | | | 709/217 |

(Continued)

FOREIGN PATENT DOCUMENTS

| EP | 3407283 A1 | 11/2018 |
| EP | 3557505 A1 | 10/2019 |
| WO | 2018/208491 A1 | 11/2018 |

OTHER PUBLICATIONS

Camunda. "Modeler," located at <https://www.camunda.com/products/camunda-bpm/modeler/> visited on Aug. 13, 2020; 4 pages.

(Continued)

*Primary Examiner* — Tamara T Kyle
*Assistant Examiner* — Koorosh Nehchiri
(74) *Attorney, Agent, or Firm* — Morrison & Foerster LLP

(57) ABSTRACT

Described herein are systems, methods, and graphical user interfaces for creating conversation models that may be executed by natural language understanding systems and/or intelligent assistant systems, particularly in enterprise and corporate environments. A conversation modeling interface may allow a modeler to position a plurality of graphical conversation-element objects on a canvas region of the interface, to specify associations and relationships between the various represented conversation-elements to define a conversation flow, and to provide input data to define various parameters and characteristics of the conversation-elements of the conversation. The system may generate and store a conversation model based on the visual representation of the conversation model created in the modeling interface, and functionality of the conversation model may be configured in accordance with the conversation-element types positioned on the canvas region, the relationships and (Continued)

links defined between the various elements, and the data input with respect to the various elements.

29 Claims, 7 Drawing Sheets

(51) Int. Cl.
*G06F 3/0486* (2013.01)
*G06F 3/16* (2006.01)
*G06N 5/02* (2023.01)

(56) References Cited

U.S. PATENT DOCUMENTS

| | | | | |
|---|---|---|---|---|
| 7,849,440 | B1* | 12/2010 | Englehart | G06F 8/34 |
| | | | | 717/106 |
| 9,672,827 | B1* | 6/2017 | Jheeta | G06F 16/338 |
| 10,395,641 | B2* | 8/2019 | Dhoolia | G10L 15/01 |
| 10,776,725 | B2* | 9/2020 | Ding | G06Q 10/04 |
| 10,831,799 | B2* | 11/2020 | Dhoolia | G10L 15/1822 |
| 11,043,205 | B1 | 6/2021 | Su et al. | |
| 11,087,739 | B1 | 8/2021 | Rastrow et al. | |
| 11,170,776 | B1 | 11/2021 | Whalin | |
| 11,190,466 | B2* | 11/2021 | Whitten | G06F 3/0482 |
| 11,210,593 | B1* | 12/2021 | Yue | G06F 16/168 |
| 2003/0046316 | A1* | 3/2003 | Gergic | G06F 9/451 |
| | | | | 715/234 |
| 2003/0212543 | A1* | 11/2003 | Epstein | G06F 40/211 |
| | | | | 704/9 |
| 2005/0289124 | A1* | 12/2005 | Kaiser | G06F 16/24522 |
| 2010/0115048 | A1 | 5/2010 | Scahill | |
| 2010/0138215 | A1 | 6/2010 | Williams | |
| 2012/0254143 | A1* | 10/2012 | Varma | G06F 40/30 |
| | | | | 707/706 |
| 2013/0212042 | A1 | 8/2013 | Rosenberg | |
| 2014/0136187 | A1* | 5/2014 | Wolverton | G10L 15/22 |
| | | | | 704/9 |
| 2016/0110229 | A1* | 4/2016 | Rector | G06F 9/54 |
| | | | | 719/328 |
| 2016/0364377 | A1* | 12/2016 | Krishnamurthy | G06F 40/30 |
| 2017/0116982 | A1* | 4/2017 | Gelfenbeyn | G10L 15/22 |
| 2017/0206064 | A1* | 7/2017 | Breazeal | G06F 8/36 |
| 2017/0308389 | A1 | 10/2017 | Ducatelle et al. | |
| 2018/0107461 | A1* | 4/2018 | Balasubramanian | G06F 8/34 |
| 2018/0129484 | A1* | 5/2018 | Kannan | G06F 3/0482 |
| 2018/0198827 | A1 | 7/2018 | Eifler et al. | |
| 2018/0241764 | A1 | 8/2018 | Nadolski et al. | |
| 2018/0276261 | A1 | 9/2018 | Smart | |
| 2018/0302346 | A1* | 10/2018 | Xie | H04L 51/02 |
| 2018/0314689 | A1* | 11/2018 | Wang | G10L 15/22 |
| 2019/0073197 | A1 | 3/2019 | Collins | |
| 2019/0121801 | A1 | 4/2019 | Jethwa et al. | |
| 2019/0163694 | A1* | 5/2019 | Yao | G06F 3/0486 |
| 2019/0166069 | A1* | 5/2019 | Yao | G06F 3/0486 |
| 2019/0272323 | A1* | 9/2019 | Galitsky | G06F 40/205 |
| 2019/0377619 | A1* | 12/2019 | Riva | G06F 9/543 |
| 2020/0004874 | A1* | 1/2020 | Gupta | G06F 3/167 |
| 2020/0005117 | A1* | 1/2020 | Yuan | G06F 40/30 |
| 2020/0057946 | A1 | 2/2020 | Singaraju et al. | |
| 2020/0104402 | A1 | 4/2020 | Burnett et al. | |
| 2020/0218766 | A1* | 7/2020 | Yaseen | G06Q 10/04 |
| 2020/0310598 | A1* | 10/2020 | Colevas | G06F 3/167 |
| 2020/0312324 | A1 | 10/2020 | Tang | |
| 2021/0090575 | A1* | 3/2021 | Mahmood | G10L 17/10 |
| 2021/0136008 | A1* | 5/2021 | Whitten | H04L 51/02 |
| 2021/0286950 | A1 | 9/2021 | Quamar et al. | |
| 2021/0303578 | A1 | 9/2021 | Dua et al. | |
| 2021/0303636 | A1 | 9/2021 | Dua et al. | |

OTHER PUBLICATIONS

Dua et al., U.S. Office Action dated Oct. 8, 2021, directed to U.S. Appl. No. 16/836,637; 49 pages.
International Search Report and Written Opinion mailed Jul. 7, 2021, directed to International Application No. PCT/US2021/024355; 16 pages.
Dua et al., U.S. Office Action mailed Apr. 13, 2022, directed to U.S. Appl. No. 16/836,637; 55 pages.
Dua et al., U.S. Office Action mailed Mar. 4, 2022, directed to U.S. Appl. No. 16/836,681; 21 pages.

* cited by examiner

SYSTEMS AND METHODS FOR CONVERSATION MODELING

FIELD

This disclosure related generally to conversation modeling, and more specifically to improved systems and methods for graphical user interfaces for creating conversation models.

BACKGROUND

Natural language understanding (NLU) technology and intent-recognition technology endeavor to process spoken and/or typed user inputs (utterances) and to determine the intent of the user, in order to display desired content to the user and/or execute the technical process, business process, and/or conversation intended by the user. In some embodiments, the desired interaction between an end-user and the system may be facilitated by a conversation model that may be executed by an intelligent assistant or conversational agent, wherein the conversation model may define one or more user utterances/inputs and one or more system responses in a logically-defined relationship with one another. The intelligent assistant system and/or conversational agent may be configured to execute the modeled conversation in accordance with detecting an end-user utterance or input that triggers execution of the conversation model. Execution of the conversation model may provide the system end-user with desired information and/or system functionality.

SUMMARY

As described above, end-users may interact with systems, such as intelligent assistant systems, by triggering execution of one or more conversation models. However, known solutions for conversation modeling may be insufficiently robust to meet the specific needs of corporate environments, such as corporate systems/networks, enterprise systems/networks, internal corporate networks, and the like. For example, problems of "intent overlap"—where certain user utterances may have many different potential meanings—may be amplified in corporate environments, for example where same or similar terms may have different meanings related to different intents in different aspects of a multifaceted corporate environment. Known NLU and conversation modeling systems may leverage machine-learning using massive data-sets to refine intent recognition capabilities; however, there may be insufficient data for corporate applications for machine-learning approaches to be effective. Accordingly, there is a need for improved methods of creating, configuring, and refining conversation models for NLU systems and intelligent assistant systems for use in corporate environments.

Described herein are systems, methods, and graphical user interfaces for conversation modeling. The systems, methods, and user interfaces described herein may address one or more of the above needs. In some embodiments, a conversation modeling system is provided, wherein the conversation modeling system is configured to provide a graphical user interface for creating (e.g., generating, configuring, storing, etc.) and deploying conversation models. In some embodiments, the user interface for creating and deploying conversation models includes a canvas region on which a user of the GUI may position a plurality of graphical user interface objects, each of the graphical objects representing a conversation-element in the conversation model. The user of the GUI may provide information to one or more fields for one or more of the graphical objects, thereby configuring various functionalities for the conversation model. Additionally, the user of the GUI may designate connections (including conditional connections) between different graphical objects, wherein the connections may represent a flow or progression of the conversation model during execution of the conversation model.

The conversation modeling system may additionally provide functionality for automatically validating and/or optimizing the conversation model being created via the GUI, and may provide functionality for previewing execution of the business model being created via the GUI. Once the GUI user has arranged the graphical representation of the conversation model as desired and has provided all data for the various fields of the various elements of the conversation model, the system may generate a data structure constituting the conversation model, and the data structure itself may be stored on the system and/or transmitted to one or more other systems for storage and/or execution thereon.

In some embodiments, a modeling system for creating interactive conversation models for use by an intelligent assistant system is provided, the modeling system comprising one or more processors, one or more displays, and memory storing instructions configured to be executed by the one or more processors to cause the modeling system to: display a canvas region of a graphical user interface for creating conversation models; display a conversation-element menu comprising a plurality of graphical conversation-element menu objects each representing a respective conversation-element type; create a visual representation of a conversation, the visual representation comprising one or more graphical conversation-element objects, wherein creating the visual representation comprises: detecting a conversation-element placement input from a user, wherein the input comprises selection of one of the conversation-element menu objects and indication of a location on the canvas region; in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object; and generate and store a model of the conversation in accordance with the one or more graphical conversation-element objects of the visual representation of the conversation.

In some embodiments of the modeling system, creating the visual representation of the conversation further comprises: detecting a conversation-element linking input from a user indicating an association within the conversation between two conversation-elements represented by two graphical conversation-element objects of the visual representation of the conversation; in response to detecting the conversation-element linking input, displaying a flow indicator on the canvas region indicating an association between the two graphical conversation-element objects.

In some embodiments of the modeling system, generating and storing a model of the conversation in accordance with the one or more graphical conversation-element objects of the visual representation comprises generating and storing the model in accordance with the flow indicator.

In some embodiments of the modeling system, generating and storing the model of the conversation comprises generating and storing, in accordance with the conversation-element type, instructions to initiate execution of the conversation model.

In some embodiments of the modeling system, generating and storing the model of the conversation comprises generating and storing, in accordance with the conversation-element type, instructions to finalize execution of the conversation model.

In some embodiments of the modeling system, generating and storing the model of the conversation comprises generating and storing, in accordance with the conversation-element type, instructions to receive input during execution of the conversation model.

In some embodiments of the modeling system, generating and storing the model of the conversation comprises generating and storing, in accordance with the conversation-element type, instructions to provide output during execution of the conversation model.

In some embodiments of the modeling system, generating and storing the model of the conversation comprises generating and storing, in accordance with the conversation-element type, instructions to call an API during execution of the conversation model.

In some embodiments of the modeling system, generating and storing the model of the conversation comprises generating and storing, in accordance with the conversation-element type, instructions to execute a subsequent step, during execution of the conversation model, in accordance with one or more predefined conditions being satisfied.

In some embodiments of the modeling system, generating and storing the model of the conversation comprises generating and storing, in accordance with the conversation-element type, instructions to execute script during execution of the conversation model.

In some embodiments of the modeling system, generating and storing the model of the conversation comprises generating and storing, in accordance with the conversation-element type, instructions to associate the conversation with an embedded conversation.

In some embodiments of the modeling system, the instructions further cause the modeling system to: in response to detecting the conversation-element placement input, display a graphical interface element prompting the user to enter data associated with a field of the conversation-element; and detect a data entry input for the field of the conversation-element; wherein generating and storing the model of the conversation is based at least in part on the data entry input.

In some embodiments of the modeling system, the data entry input indicates an utterance.

In some embodiments of the modeling system, the data entry input indicates an output value.

In some embodiments of the modeling system, the data entry input indicates a schema name.

In some embodiments of the modeling system, data entry input indicates a response variable.

In some embodiments of the modeling system, the data entry input indicates a response type.

In some embodiments of the modeling system, the data entry input indicates an endpoint.

In some embodiments of the modeling system, the data entry input indicates a return variable.

In some embodiments of the modeling system, the data entry input indicates a parameter.

In some embodiments of the modeling system, the data entry input indicates executable script.

In some embodiments of the modeling system, the data entry input indicates a condition.

In some embodiments of the modeling system, the data entry input indicates an order for a condition.

In some embodiments of the modeling system, the instructions further cause the modeling system to: receive key input from a user indicating a key to be uniquely associated with the model of the conversation; verify that the key is unique amongst a set of other respective keys for a set of other conversation models; wherein generating and storing the model of the conversation is performed in accordance with verifying that the key is unique.

In some embodiments of the modeling system, the instructions further cause the modeling system to: after generating and storing the model of the conversation, display a visual preview of execution of the conversation model.

In some embodiments of the modeling system, the instructions further cause the modeling system to: after generating and storing the model of the conversation, execute the conversation model.

In some embodiments of the modeling system, the instructions further cause the modeling system to validate data for the conversation model.

In some embodiments of the modeling system, validating data comprises one or more of validating that a key identifying the model is unique amongst a set of keys, validating that data entered by a user into a field of a conversation-element of the model satisfies predefined criteria, and validating that the model does not include an impermissible overlap of an utterance with another conversation model.

In some embodiments of the modeling system, the instructions further cause the modeling system to: receive a versioning input from a user; and wherein storing generating and storing the model of the conversation comprises storing the model of the conversation with versioning information based on the versioning input.

In some embodiments of the modeling system, the instructions further cause the modeling system to enforce a business review process to ensure that the conversation model conforms with an enterprise requirement.

In some embodiments, a method for creating interactive conversation models for use by an intelligent assistant system is provided, the method performed by a modeling system comprising one or more processors and one or more displays, the method comprising: displaying a canvas region of a graphical user interface for creating conversation models; displaying a conversation-element menu comprising a plurality of graphical conversation-element menu objects each representing a respective conversation-element type; creating a visual representation of a conversation, the visual representation comprising one or more graphical conversation-element objects, wherein creating the visual representation comprises: detecting a conversation-element placement input from a user, wherein the input comprises selection of one of the conversation-element menu objects and indication of a location on the canvas region; in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object; and generating and storing a model of the conversation in accordance with the one or more graphical conversation-element objects of the visual representation of the conversation.

In some embodiments, a non-transitory computer-readable storage medium storing instructions for creating interactive conversation models for use by an intelligent assistant system is provided, the instructions configured to be executed by a modeling system comprising one or more processors and one or more displays, the instructions configured to cause the system to: display a canvas region of a graphical user interface for creating conversation models; display a conversation-element menu comprising a plurality of graphical conversation-element menu objects each representing a respective conversation-element type; create a visual representation of a conversation, the visual representation comprising one or more graphical conversation-element objects, wherein creating the visual representation comprises: detecting a conversation-element placement input from a user, wherein the input comprises selection of one of the conversation-element menu objects and indication of a location on the canvas region; in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object; and generate and store a model of the conversation in accordance with the one or more graphical conversation-element objects of the visual representation of the conversation.

It will be appreciated that any of the embodiments, aspects, features and options described in view of the system apply equally to the method and computer-readable storage medium, and vice versa. It will also be clear that any one or more of the above embodiments, aspects, features and options can be combined. In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Described herein are exemplary embodiments of systems, methods, and/or user interfaces for conversation modeling, which may address the problems and shortcomings of known conversation modeling systems and methods described above.

Exemplary Conversation Modeling System

Figure 1:
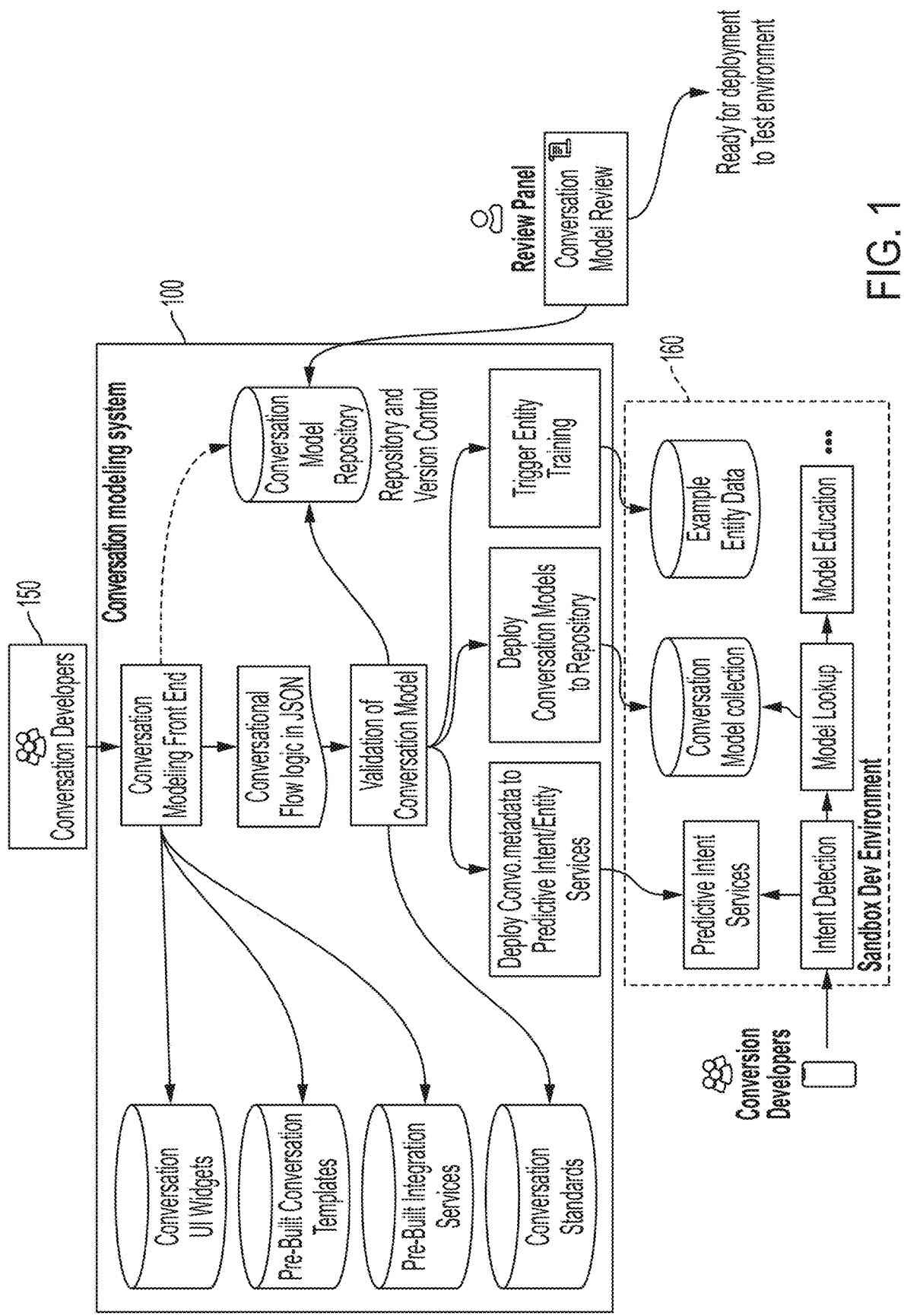
FIG. 1 depicts a system for conversation modeling, in accordance with some embodiments.

FIG. 1 depicts a conversation modeling system 100, in accordance with some embodiments. In some embodiments, system 100 may be configured, as explained herein, to provide one or more graphical user interfaces enabling users to create interactive conversation models. System 100 may receive from users, via the one or more graphical user interfaces provided, instructions for creating an interactive conversation model, and system 100 may generate, configure, validate, and deploy an interactive conversation model in accordance with the user's input. In some embodiments, deployment of the conversation model may include transmission and/or storage of the conversation model, such that the model may be called by and used by (e.g., caused to be executed by) one or more associated systems, such as a natural language processing system and/or a predictive intent system, such as those systems disclosed in the U.S. patent application No. 16/836,637, filed Mar. 31, 2020, titled "SYSTEMS AND METHODS FOR AUTOMATICALLY DETERMINING UTTERANCES, ENTITIES, AND INTENTS BASED ON NATURAL LANGUAGE INPUTS,", and/or in the U.S. patent spplication Ser. No. filed Mar. 31, 2020, titled "SYSTEMS AND METHODS FOR AUTOMATICALLY DETERMINING UTTERANCES, ENTITIES, AND INTENTS BASED ON NATURAL LANGUAGE INPUTS,".

System 100 may be provided as any suitable computing system comprising one or more processors for executing conversation modeling methods and techniques such as those described herein, including providing conversation modeling interfaces such as those described herein. In some embodiments, system 100 may comprise one or more computers, mobile electronic devices, laptops, tablets, workstations, servers, and/or distributed computing systems (e.g., a plurality of servers). In some embodiments, system 100 may further include one or more computer storage mediums (a) for storing instructions for executing conversation modeling methods and techniques such as those described herein, including providing conversation modeling interfaces such as those described herein, and/or (b) for providing one or more databases, repositories, corpuses, indexes or the like that may be referenced or otherwise used in the execution of said methods and techniques.

As shown in FIG. 1, conversation modeling system 100 may be configured to receive inputs for generating and configuring conversation models from conversation model creator system 150. Conversation model creator system 150 may be any suitable user device or system (e.g., one or more computers, mobile electronic devices, laptops, tablets, workstations, servers, or the like) configured to (a) display a graphical user interface for creating a conversation model and/or (b) detect user inputs executed by a model creator for the creation of a conversation model (e.g., detecting user inputs executed via a displayed graphical user interface). Conversation model creator system 150 may be communicatively coupled to system 100 and may be configured to send and/or receive transmissions to/from system 100 via wired and/or wireless network communication.

As shown in FIG. 1, conversation modeling system 100 may be configured to deploy one or more generated conversation models to conversation model deployment system 160; that is, system 100 may be configured to transmit data representing (or otherwise associated with) an interactive conversation model to system 160, such that the model may be stored, queried, leveraged, executed, or otherwise used by system 160. In some embodiments, system 160 may be provided as any suitable computing system comprising one or more processors for executing or otherwise utilizing conversation models provided by system 100. In some embodiments, system 160 may comprise one or more computers, mobile electronic devices, laptops, tablets, workstations, servers, and/or distributed computing systems (e.g., a plurality of servers). In some embodiments, system 160 may further include one or more computer storage mediums (a) for storing instructions for executing or otherwise utilizing conversation models and/or (b) for storing one or more databases, repositories, corpuses, indexes or the like storing conversation models and/or associated conversation model data.

In some embodiments, system 160 may be a natural language processing system and/or a predictive intent system, such as those systems disclosed in the U.S. patent application Ser. No. 16/836,637, filed Mar. 31, 2020, titled "SYSTEMS AND METHODS FOR AUTOMATICALLY DETERMINING UTTERANCES, ENTITIES, AND INTENTS BASED ON NATURAL LANGUAGE INPUTS,",and/or in the U.S. patent application Ser. No. 16,836,681, filed Mar. 31, 2020, titled "SYSTEMS AND METHODS FOR AUTOMATICALLY DETERMINING UTTERANCES, ENTITIES, AND INTENTS BASED ON NATURAL LANGUAGE INPUTS,". In some embodiments, an interactive conversation model created using system 100 may be stored in a repository of conversation models, and a natural language processing system may select one or more of the stored conversation models from the repository to be executed based on inputs received from a user and processed by the natural language processing system.

Exemplary Conversation Modeling Graphical User Interfaces

FIGS. 2A-2D show exemplary screens 200*a-d* of a graphical user interface 200 for creating interactive conversation models, in accordance with some embodiments. In some embodiments, graphical user interface 200 may be provided by a conversation modeling system such as system 100. In the example of system 100, interface 200 may be generated and/or provided by system 100 and may be displayed and/or rendered on system 150. Users of interface 200 may enter inputs into system 100, which may be transmitted to system 100 for the creation, configuration, and/or deployment of an interactive conversation model.

As explained in additional detail below, interface 200 may in some embodiments allow users to create and configure a conversation model by arranging various graphical elements on a canvas region 202 of the interface and by designating various characteristics for and relationships between different ones of the graphical elements. As discussed below, the graphical elements arranged on the canvas may represent different elements in the conversation model being created; these elements in the conversation model may in some embodiments be referred to as conversation-elements. In some embodiments, similar modeling elements may be referred to as conversation model elements, task elements, and/or interactions. In some embodiments, the conversation-elements may comprise conversation-elements of different conversation-element types, including the following conversation-element types:

Start conversation;
End conversation;
Response;
User Input;
Service;
Conditional flow;
Decision gateway;
Script execution; and
Sub-process.

In some embodiments, each of the conversation-element types set out above may have different characteristics, in that conversation-elements of different types may define different functionalities, define different data structures or data structure components, include different data fields, and cause different processes to be executed upon execution of a conversation model including the various conversation-elements. Information about the different conversation-element types is set out in further detail below.

After arranging various graphical elements representing various conversation-elements on the canvas region (and designating information regarding the characteristics and relationships of the various conversation-elements), the system may then generate and/or configure a conversation model (e.g., generate a data structure constituting the conversation model).

Figure 2A:
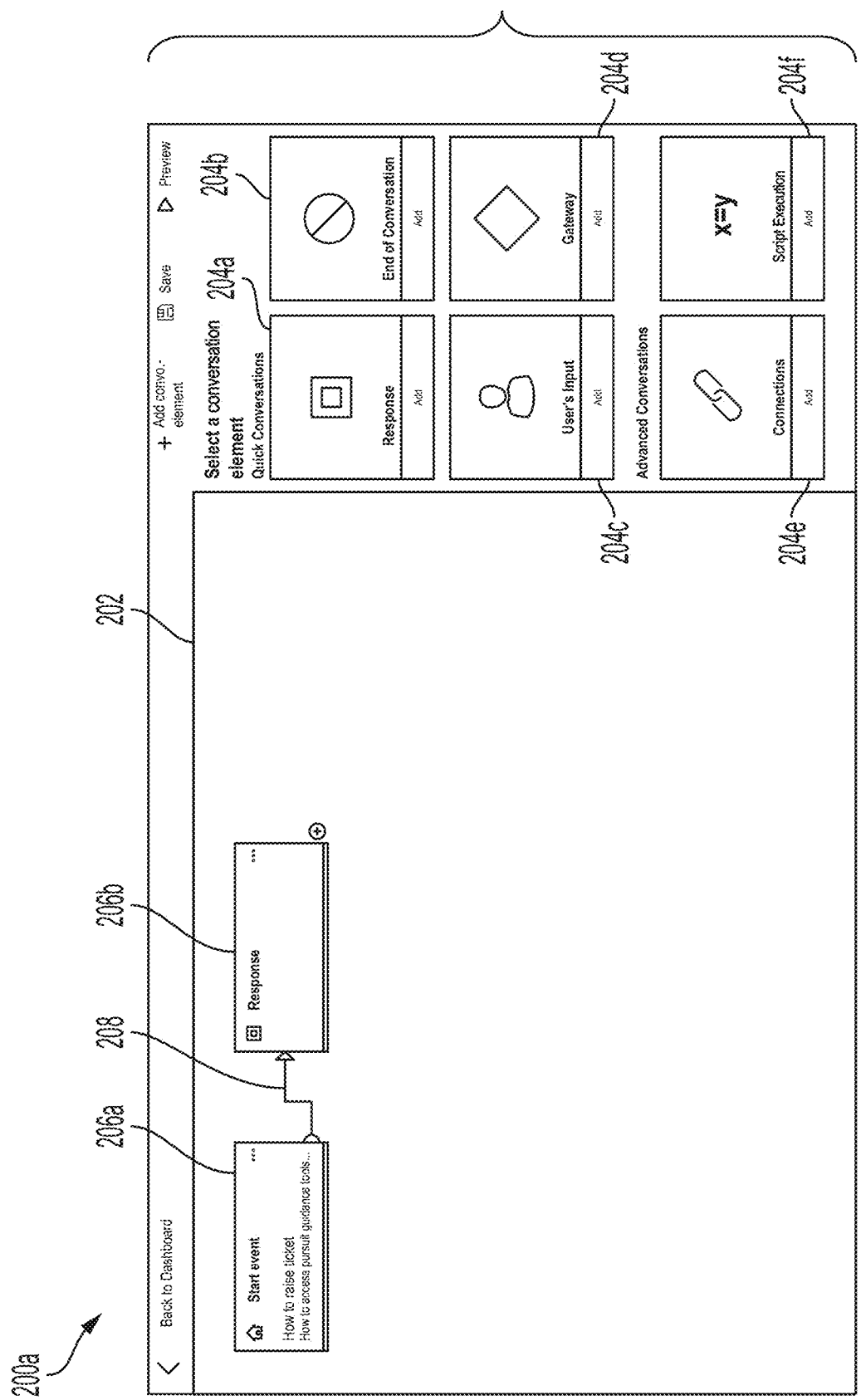
FIGS. 2A-2D show exemplary screens of a graphical user interface for creating interactive conversation models, in accordance with some embodiments.

As shown in FIG. 2A, screen 200*a* of interface 200 comprises canvas region 202 and conversation-element menu 204. In some embodiments, conversation-element menu 204 may comprise a plurality of conversation-element menu objects 204*a*-204*f* which may be selected by a user to create a new graphical conversation-element object in canvas region 202. In some embodiments, a user may drag and drop (e.g., via mouse pointer click or by touch-screen drag and drop) from one of conversation-element menu objects 204*a*-204*f* to a location on canvas region 202 to create a new graphical conversation-element object of a type corresponding to the selected conversation-element menu object. In some embodiments, input types other than drag-and-drop may be implemented in manners that would be understood by a person of skill in the art, such that a user may indicate one of the conversation-element menu objects 204*a*-204*f* and indicate a position, region, location, or slot on canvas region 202 at which or in which a corresponding graphical conversation-element object should be created (e.g., a user may first click or tap on one or the conversation-element menu objects 204*a*-204*f* and may thereafter click or tap on a location on canvas region 202).

In some embodiments, conversation-element menu 204 may be configured to be scrolled and/or paged by a user to display additional options. In some embodiments, conversation-element menu 204 may be divided into one or more sub-categories, such as the exemplary categories "Quick conversations" and "Advanced conversations" shown in the example of FIG. 2A. In some embodiments, a "quick conversation" may involve a single request and single associated response, whereas an "advanced conversation" may include multi-turn conversation (e.g., multiple requests and multiple associated responses). In some embodiments, the distinction between a "quick conversation" and an "advanced conversation" may be set in accordance with any threshold number of responses (e.g., two responses, three responses, etc.).

As shown in the example of screen 200*a* in FIG. 2A, after a user executes an input to instruct placement of a graphical conversation-element object on canvas 202, a graphical conversation-element object such as objects 206*a* and 206*b* may responsively thereafter be displayed on canvas 202 at the location (or in the region, zone, slot, etc.) specified by the user's input. In some embodiments, after placing a graphical conversation-element object on canvas 202, a user may thereafter reposition it (e.g., by dragging and dropping it) to a different position on canvas 202.

As shown, a graphical conversation-element object (e.g., 206*a* and/or 206*b*) may in some embodiments comprise one or more visual indicators that display to the user information about the graphical conversation-element object; visual indicators may comprise a conversation-element type, conversation-element title, one or more other fields displaying information about the conversation-element type, and/or one or more other fields displaying information about the data content or functionality of the conversation-element associated with the graphical conversation-element object.

In the example of graphical conversation-element object 206a, object 206a displays a "Start event" type indicator indicating that object 206a is a "Start conversation" type. Object 206a further displays visual indicators showing "How to raise ticket" as a title for the conversation-element and "How to access pursuit guidance, tools . . . " as inputs/utterances by a user that may be used to trigger the conversation.

In the example of graphical conversation-element object 206b, object 206b displays a "Response" type indicating that object 206b is a "response" type (e.g., a conversation-element configured to return response data to a user who executed an associated input/utterance triggering the response).

In some embodiments, interface 200 may further enable a user to execute one or more inputs to indicate a relationship between two or more graphical conversation-element objects on canvas 202. In response to detecting a user input indicating a relationship between two or more graphical conversation-element objects, interface 200 may display one or more visual indicators representing the indicated relationship.

In some embodiments, a relationship between two or more graphical conversation-element objects may be indicated by a visual link between the two or more graphical conversation-element objects, such as flow indicator 208a. In the example of screen 200a, flow indicator 208a is depicted as an arrow beginning at object 206a and terminating at object 206b, indicating that the represented conversation progresses first from the functionalities represented by object 206a and thereafter to the functionalities represented by object 206b.

In some embodiments, one or more flow indicators may terminate at a single graphical conversation-element object. In some embodiments, one or more flow indicators may begin at a single graphical conversation-element object. In some embodiments, multiple flow indicators may begin at a "decision gateway" type of graphical conversation-element objects; decision gateways are discussed below in further detail.

In some embodiments, a flow indicator may begin at a plurality of graphical conversation-element objects and may converge to terminate at a smaller set of (one or more) graphical conversation-element objects than the plurality from which it began. In some embodiments, a flow indicator may begin at a set of (one or more) graphical conversation-element objects and may diverge to terminate at a larger plurality of graphical conversation-element objects than the set from which it began.

After placing a graphical conversation-element object on canvas 202, user interface 200 may allow a user to execute inputs to specify information about the conversation-element represented by the respective object. For example, a user of the modeling interface may specify, via user input to the modeling interface, a range of responses that are expected based on various actions/events, wherein the actions/events may be driven by user input, external systems, data feeds, and/or a combination of events. (For example, in the case of a "user input" conversation-element, one or more properties of the conversation-element may be defined, including, for example: a data type expected from the user (e.g., number, yes/no response, text, etc.); or an intent handler or call to a service (e.g., defined as a URL to the service) and any required parameters to be passed in association with the conversation-element.)

In some embodiments, a user may enter data into one or more fields displayed by user interface 200, and the data entered may be stored in associated with the graphical conversation-element object and eventually used in generating the conversation model itself. In some embodiments, different conversation-element types may comprise different sets of one or more fields into which a user may be required to enter data and/or into which a user may optionally enter data. In some embodiments, data entered by a user may include a title for a conversation-element, one or more utterances to be associated with a conversation-element, a response type to be associated with a conversation-element, an image to be associated with a conversation-element, a URL to be associated with a conversation-element, and/or information regarding one or more actions to be associated with a conversation-element.

In some embodiments, user input of data to specify information about a conversation-element (e.g. to specify information about one or more fields of a conversation-element) may be input into a conversation-element fields window. In some embodiments, a conversation-element fields window may be a window in a graphical user interface containing a plurality of field interface objects (e.g., buttons, drop-down menus, text entry fields, etc.) for specifying information about a conversation-element (or a plurality of conversation-elements) associated with the window. In some embodiments, a conversation-element fields window may be associated (e.g., on a one-to-one basis) with a corresponding graphical conversation-element object and associated conversation-element, such that entering data via the conversation-element fields window may cause the corresponding displayed graphical conversation-element object to be updated in the canvas region.

Figure 2B:
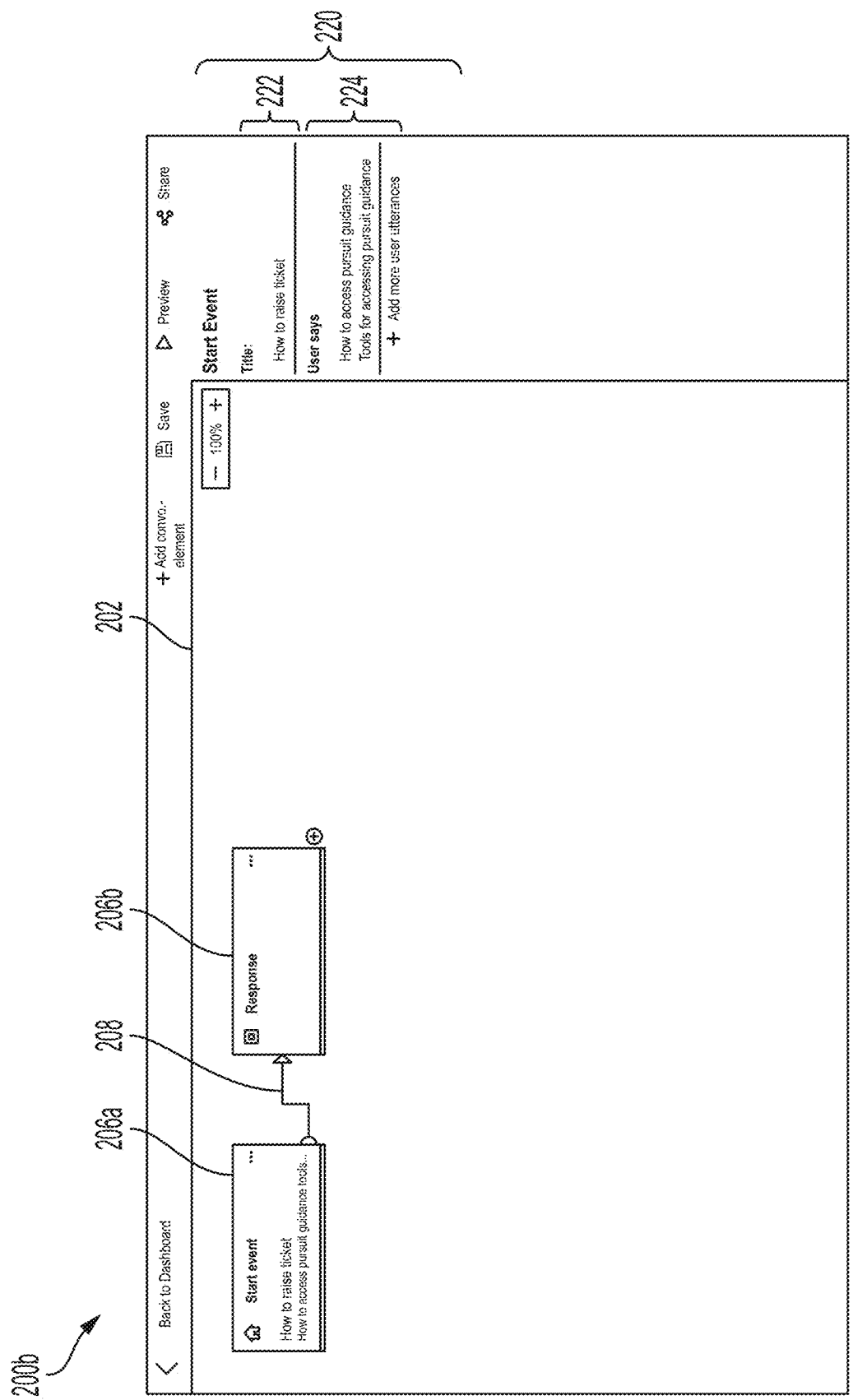

FIG. 2B shows screen 200b of interface 200, which comprises conversation-element fields window 220. Window 220 is associated with object 206a. In some embodiments, window 220 may be displayed upon selection of object 206a by a user, such as by clicking or tapping on object 206a after it is placed on canvas region 202. As shown in FIG. 2B, window 220 comprises title field portion 222 and utterance field portion 224.

As shown, title field portion 222 may be configured to allow a user to type into the portion in order to enter (or change) a title of object 206a for display on object 206a on canvas region 202.

As shown, utterance field portion 224 may be configured to allow a user to type one or more utterances into the portion in order to indicate utterances to be associated with the conversation-element corresponding to object 206a. In some embodiments, a field portion such as utterance field portion 224 may enable a user to enter more than one entry in the same field, such as by typing multiple separate entries (e.g., multiple different utterances). As shown by utterance field portion 224, a user may in some embodiment select an option (e.g., click or tap an icon) to add additional entries for a field, such as additional utterances in the case of utterance field portion 224.

In the example shown, the user of interface 200 has entered two utterances into utterance field portion 224: "How to access pursuit guidance," and "tools for accessing pursuit guidance." In response to the user of the modeling interface entering the utterances, the utterances may be stored in association with object 206a and a representation of the utterances may be displayed (in whole or in part) as a part of object 206a.

Furthermore, the conversation model generated in accordance with the inputs to interface 200 may be configured in accordance with the utterances entered into utterance field portion 224. In some embodiments, utterances associated with a conversation-element (e.g., a "start conversation" type conversation-element) may be utterances that may be used to call or initialize a conversation, such that when a user of the conversation model types or speaks that utterance into a system capable of implementing the conversation, the conversation may be responsively called and/or executed. Thus, for the example shown, the conversation model being created may be called in response to a user of the conversation model typing or stating "how to access pursuit guidance" or "tools for accessing pursuit guidance."

Figure 2C:
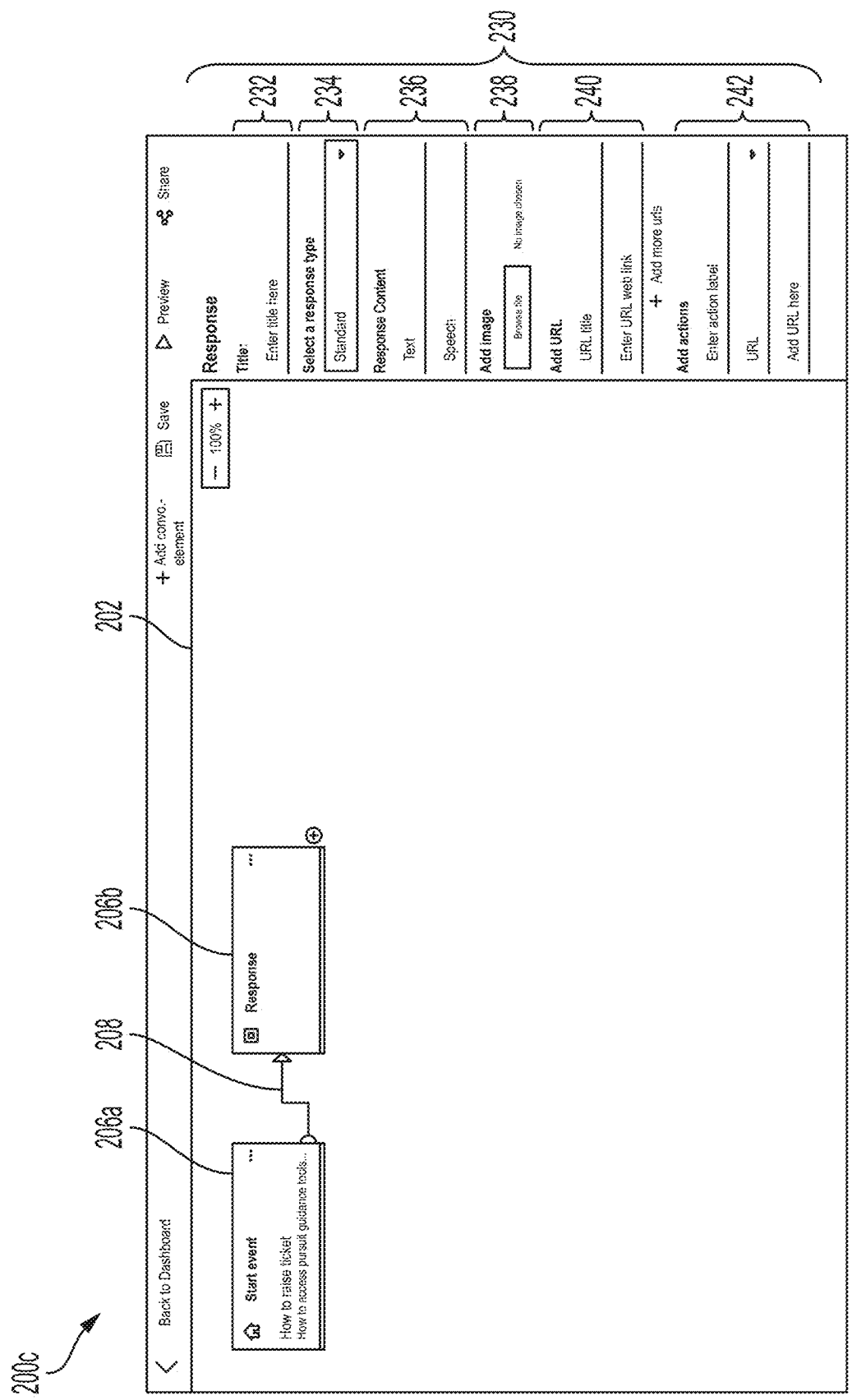

As shown in FIG. 2C, screen 200*c* of interface 200 comprises conversation-element fields window 230. Window 230 is associated with object 206*b*. In some embodiments, window 230 may be displayed upon selection of object 206*b* by a user of the modeling interface, such as by clicking or tapping on object 206*b* after it is placed on canvas region 202. As shown in FIG. 2C, window 230 comprises a different set of field portions as compared to window 220 in FIG. 2B. In some embodiments, the set of field portions displayed in a conversation-element fields window may be determined by the conversation-element type of the associated graphical conversation-element object; in this case, object 206*a* represents a "start conversation" type conversation-element, whereas object 206*b* represents a "response" type conversation-element, so the set of fields shown in windows 220 and 230 is different.

In the example shown, window 230 comprises title field portion 232, response type field portion 234, response content field portion 236, image field portion 238, URL field portion 240, and actions field portion 242.

In some embodiments, title field portion 232 may be configured to allow a user to type into the portion in order to enter (or change) a title of object 206*b* for display on object 206*b* on canvas region 202.

In some embodiments, response type field portion 234 may be configured to allow a user to indicate a response type (e.g., by typing a response type, selecting a response type from a menu, etc.). Data regarding the selected response type may be stored in association with object 206*b*, and the conversation model generated in accordance with the inputs to interface 200 may be configured in accordance with the data regarding the selected response type.

In some embodiments, response content field portion 236 may be configured to allow a user to indicate a response (e.g., by entering a response to be spoken and/or displayed via text as part of the response generated during execution of the conversation model). Data regarding the indicated response content may be stored in association with object 206*b*, and the conversation model generated in accordance with the inputs to interface 200 may be configured in accordance with the data regarding the indicated response content (e.g., the conversation model may be configured to output the response content to a user of the conversation model).

In some embodiments, image field portion 238 may be configured to allow a user to specify or input (e.g., upload) an image. Data regarding the indicated image may be stored in association with object 206*b*, and the conversation model generated in accordance with the inputs to interface 200 may be configured in accordance with the data regarding the indicated image (e.g., the conversation model may be configured to output the image to a user of the conversation model).

In some embodiments, URL field portion 240 may be configured to allow a user to specify a URL (e.g., a URL title and a URL link). Data regarding the indicated URL may be stored in association with object 206*b*, and the conversation model generated in accordance with the inputs to interface 200 may be configured in accordance with the data regarding the indicated URL (e.g., the conversation model may be configured to output the URL to a user of the conversation model).

In some embodiments, actions field portion 242 may be configured to allow a user to specify or indicate one or more actions. In some embodiments, an action field may define one or more actions that may be performed by the system as part of a response to a user input. An action field may be a field for defining one or more automated actions that may be taken by the system in response to a user input and/or one or more suggested actions that may be suggested to the user in response to a user input. Exemplary actions may include processes for scheduling a meeting, looking up a contact, composing an email, or the like. Data regarding indicated action may be stored in association with object 206*b*, and the conversation model generated in accordance with the inputs to interface 200 may be configured in accordance with the data regarding the indicated action (e.g., the conversation model may be configured to perform the indicated action during execution of the conversation model). In some embodiments, the action field may comprise one or more URLs (and/or one or more other location indicators and/or resource locators) that may be used by the system in performing the specified action. In some embodiments, an action may define one or more additional related requests that may be made by a user of the conversation model. In some embodiments, values defined by the action field may be represented as an input or as a response mechanism for the one or more additional related requests.

Figure 2D:
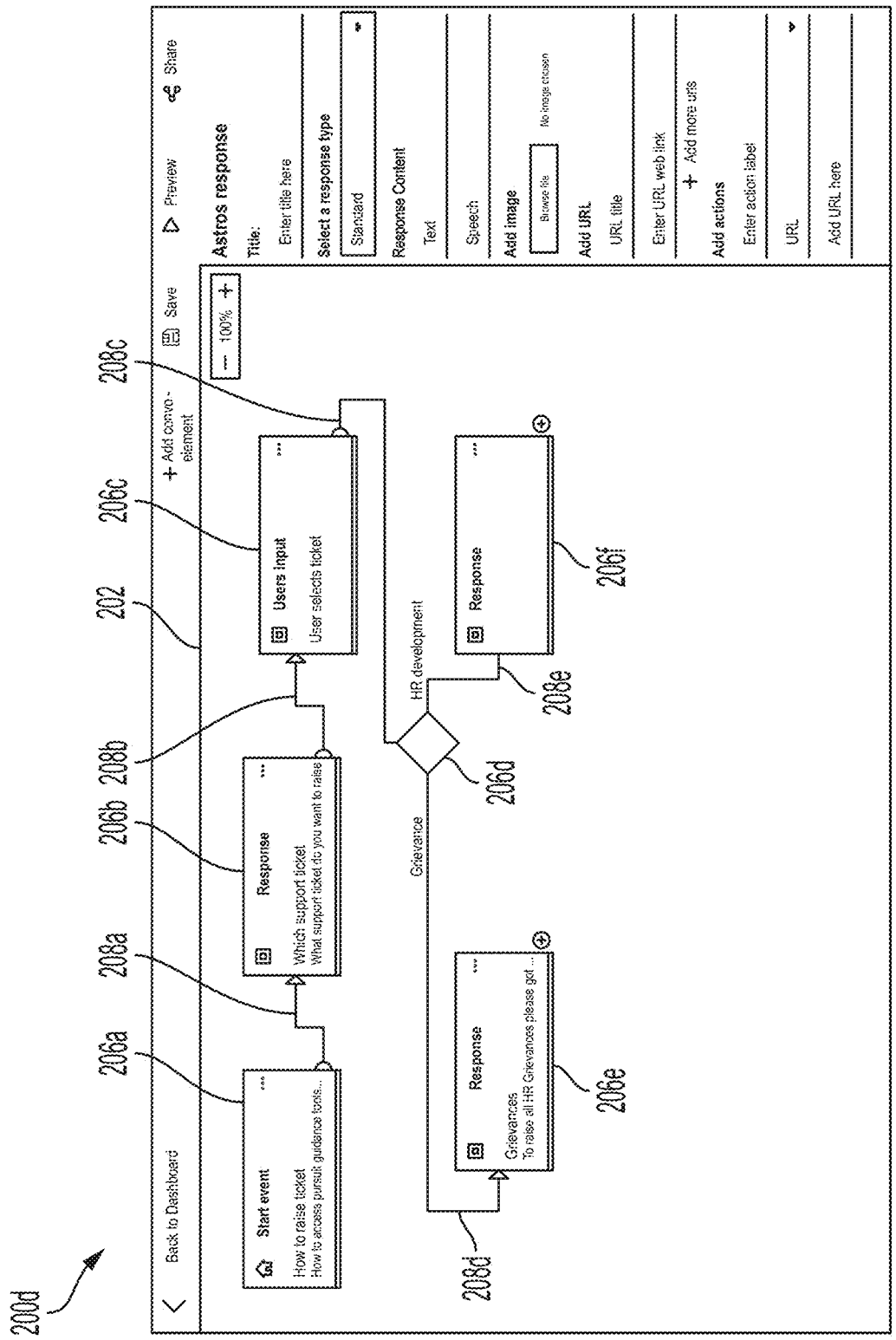

FIG. 2D shows screen 200*d* of interface 200, which shows the graphical representation of the conversation model on canvas region 202 in a more developed state, including (in addition to conversation-elements 206*a* and 206*b*) conversation-elements 206*c*-*f*. As shown, conversation-element 206*c* is a "user input" type conversation-element following after conversation-element 206*b* via flow indicator 208*b*; conversation-element 206*d* is a "decision gateway" type element following after conversation-element 206*c* via flow indicator 208*c*; conversation-element 206*e* is a "response" type conversation-element following after conversation-element 206*d* via flow indicator 208*d*; and conversation-element 206*f* is a "response" type conversation-element following after conversation-element 206*d* via flow indicator 208*e*.

As shown by the graphical representation of the conversation, the conversation may flow from input element 206*c* and through gateway element 206*d* to either response element 206*e* or to response element 206*f*; in some embodiments, gateway 206*d* may determine which response (e.g., 206*e* or 206*f*) is produced during execution of the conversation model in accordance with the user input indicated during execution of the conversation model at input element 206*c*.

Exemplary Conversation Model Conversation-Element Types

This section provides additional detail regarding exemplary conversation-element types, including the "start conversation" conversation-element type, the "end conversation" conversation-element type, the "user input" conversation-element type, the "service execution" conversation-element type, the "conditional flow" conversation-element type, the "decision gateway" conversation-element type, and the "sub-process" conversation-element type.

Each element type may be associated with type-specific functionality, such that inserting a conversation-element of a certain type into the conversation model being created will cause the conversation model to contain instructions to execute the associated functionality for that specific type; for example, inserting a decision gateway conversation-element into a graphical representation of a conversation model being created will cause the conversation model, when generated, to contain instructions (e.g., code) for executing a decision in accordance with the characteristics and fields of the decision gateway conversation-element.

Furthermore, as discussed above, each element type may have a type-specific set of associated fields, and data inputted into those fields may be used to generate and configure the data structure constituting the conversation model; for example, an utterance input into a field of an utterance field of a start conversation conversation-element may cause the conversation model to be called and/or executed in response to the utterance specified.

Below, exemplary conversation-element types are addressed in turn, and exemplary functionality and fields are explained for each of the exemplary conversation-element types.

1. Start Conversation

In some embodiments, a "start conversation" conversation-element may provide functionality to start a conversation flow. When creating a new conversation model diagram in an interface such as those described herein, a user may first insert a "start conversation" graphical conversation-element object.

In some embodiments, a "start conversation" conversation-element may comprise data representing one or more utterances that may trigger execution of the conversation model to be started. In some embodiments, the utterances indicated by the conversation-element may be used to determine an intent of the user of the conversation model, which may thereafter guide an application in the selection of the conversation model to be executed. In some embodiments, there may be no limit to the number of utterances that may be included in a "start conversation" conversation-element, such that a conversation model may be triggered/called by an unrestricted number of different utterances.

In some embodiments, a conversation modeling system may be configured such that a conversation model may contain only a single "start conversation" conversation-element. In this way, the conversation model may have only a single entry point for execution of the conversation model.

In some embodiments, a "start conversation" conversation-element may contain an "initial utterances" field. An "initial utterances" field may be configured to accept input data designating words and/or phrases (e.g., utterances) that may be spoken and/or typed to trigger selection and/or execution of the conversation model. In some embodiments, an "initial utterances" field may be configured to accept an unlimited number of different utterances.

2. End Conversation

In some embodiments, an "end conversation" conversation-element may provide functionality to end a conversation flow, for example by providing instructions for signaling to an engine (e.g., processor) executing the conversation model that there is no additional process in the flow and to finalize execution (and optionally prepare for execution of a next conversation model).

In some embodiments, an "end conversation" conversation-element may provide functionality to return one or more objects or values to an engine (e.g., processor) executing the conversation model, e.g., for further processing of the returned value or object by the engine. This functionality may, in some embodiments, enable one conversation model to call another conversation model and pass its state (e.g., information or data that is required by another conversation model to complete an end-to-end process including multiple conversation models) during the interaction. Thus, conversation models may chain-execute and may dynamically pass values while doing so. This feature may allow conversation modelers to reduce duplication in common logic, and may promote modularity when building conversation models.

In some embodiments, a conversation modeling system may be configured such that a conversation model may contain multiple "end conversation" conversation-elements. In this way, the conversation model may have multiple different points in the conversation flow at which execution of the conversation model may terminate.

In some embodiments, an "end conversation" conversation-element may contain an "output" field. An "output" field may be configured to accept a value to be returned upon termination of execution of the conversation model. An "output" field may be optional (e.g., a user creating the conversation model may not be required to supply any value for the field). In some embodiments, an "output" field may be used in instances when a conversation model is called from within another conversation model. Thus, an "output" field may represent processed data from a secondary conversation that is returned to the original conversation model that called or otherwise initiated the secondary conversation model. In some embodiments in which a conversation model is executed without being called from another conversation model, an output field may be ignored.

3. Response

In some embodiments, a "response" conversation-element may provide functionality to generate and provide a response to an utterance or other input from a user of the conversation model.

In some embodiments, a "response" conversation-element may comprise data representing one or more responses/outputs to be transmitted to, displayed to, or otherwise provided to a user of the conversation model who entered an associated utterance/input triggering the response. In some embodiments, there may be no limit to the number of response outputs that may be included in a "response" conversation-element, such that a conversation model may be provide one or more responses/outputs in response to a single associated utterance/input (or in response to more than one associated utterances/inputs and/or to more than one set of associated utterances/inputs).

In some embodiments, a "response" conversation-element may contain a title field, a response type field, a response content field, an image field, a URL field, and/or an actions field, each of which may define content to be output to a user of the conversation model by the system in order execute the response to the user of the conversation model.

In some embodiments, a title field may define a title of the response conversation-element, which may define a title to be displayed with an associated graphical conversation-element object.

In some embodiments, a response type field may define a response type. In some embodiments, response types may include text for display, speech to be outputted, an image to be displayed, URL, and/or card (e.g., a data card to be displayed to a user containing images and/or text). In some embodiments, one or more fields of the conversation modeling interface for providing data for a response conversation-element may be activated and/or deactivated (e.g., displayed and/or hidden) in accordance with a selection of a response type made by a user. In some embodiments, certain fields may be displayed by default (e.g., text, speech) may be displayed by default and/or without regard to what response type is selected; in some embodiments, certain fields may only be displayed when certain response types are selected (e.g., an image field may only be displayed when an image response type is indicated).

In some embodiments, a response content field may define content to be provided to the user of the conversation model as part of the response, such as text content and/or speech content to be outputted. In some embodiments, the conversation model may be configured to output the response content to a user of the conversation model.

In some embodiments, an image field may define one or more images that may be provided to the user of the conversation model as part of the response. In some embodiments, the conversation model may be configured to output the image(s) to a user of the conversation model.

In some embodiments, a URL field may define one or more URLs (and/or one or more other location indicators and/or resource locators) that may be provided to the user of the conversation model as part of the response. In some embodiments, the conversation model may be configured to output the URL(s) to a user of the conversation model. In some embodiments, a URL field may be displayed as part of an action field or action window as described below.

In some embodiments, an action field may define one or more actions that may be performed by the system as part of the response. An action field may be a field for defining one or more automated actions that may be taken by the system in response to a user input and/or one or more suggested actions that may be suggested to the user in response to a user input. Exemplary actions may include processes for scheduling a meeting, looking up a contact, composing an email, or the like. In some embodiments, the action field may comprise one or more URLs (and/or one or more other location indicators and/or resource locators) that may be used by the system in performing the specified action. In some embodiments, an action may define one or more additional related requests that may be made by the user of the conversation model. In some embodiments, values defined by the action field may be represented as an input or as a response mechanism for the one or more additional related requests.

4. User Input

In some embodiments, a "user input" conversation-element may provide functionality to capture one or more interactions between an end user of the conversation at the channel (e.g., a user of the conversation model) and the engine (e.g., processor) executing the conversation. In some embodiments, interactions may include clicking a URL, voice inputs, text inputs, and/or touch/gesture inputs. In some embodiments, a "user input" conversation-element type may provide functionality to, once encountered by an engine executing the conversation model, await end-user input through one or more interactions. In some embodiments, the conversation-element may configure the conversation model to await the one or more interactions for a predetermined or dynamically determined amount of time (e.g., before timing out).

In some embodiments, a "user input" conversation-element may contain a UI specific schema that may be used for rendering display for a conversation model at a channel for an end user of the conversation model. In some embodiments, a "user input" conversation-element may contain a data section, within a response, that may house content to be sent to the channel for processing and display during execution of the conversation model. In some embodiments, said data may come from an API call, a database call, a calculated value, user input, and/or one or more model parameters.

In some embodiments, a "user input" conversation-element may provide functionality to capture data from the channel and to store that data in a variable that may be referenced by the conversation model and managed by an engine executing the conversation model. In some embodiments, a variable name for said variable may be indicated by a field of the "user input" conversation-element.

In some embodiments, a "user input" conversation-element may comprise an identification of the type of input to be accepted from the end user of the conversation model during execution of the conversation model. For example, a "user input" conversation-element may specify that input should be in a Yes/No format; in some embodiments, a conversation model execution engine may then process end-user input to convert input into the acceptable format (e.g., "Yes" or "No"), such as by mapping other utterances onto the permitted utterances. As another example, a "user input" conversation-element may specify that input should be "unfiltered." Indication of an "unfiltered" input type may indicate that the conversation model should accept input in any form entered by the end user of the conversation model during execution, e.g., without any augmentation or changing.

In some embodiments, a "user input" conversation-element may contain a "schema name" field. A "schema name" field may represent a UI mapping that may be implemented by a channel during execution of the conversation model. In some embodiments, a "schema name" field may be configured to be interpreted by said channel. In some embodiments, a "schema name" field may be verified by the conversation modeling system upon being indicated by a user (e.g., modeler) of the conversation modeling system.

In some embodiments, a "user input" conversation-element may contain a "response variable" field. A "response variable" field may designate information regarding a reference variable for an end-user response received via the channel during execution of the conversation model. In some embodiments, the reference variable may be referenced in one or more condition statements for logical branches in the conversation model in accordance with the end-user's response.

In some embodiments, a "user input" conversation-element may contain a "response type" field. A "response type" field may allow the creator of the conversation model to indicate a manner in which input from an end user of the conversation model during execution should or should not be refined. For example, a "response type" field may indicate that end-user inputs during execution should be accepted in an unfiltered manner, such that the conversation model will accept exactly the input received, without refinement, manipulation, or augmentation. Alternatively, a "response type" field may indicate that end-user inputs during execution should be accepted in a "Yes/No" format, thereby causing the conversation model to refine responses received during execution into acceptable "Yes" or "No" responses. In some embodiments, the "response type" field may allow introduction of refinements to the conversation model, such that the language of end-users of the conversation model may be more accurately interpreted.

5. Service Execution

In some embodiments, a "service execution" conversation-element may provide functionality to make calls to APIs within the conversation model flow. Calls to APIs may be used to allow the conversation model to reach out to one or more other applications to search, gather, and aggregate information into a result set that may be evaluated by the conversation model and/or displayed to a user of the conversation model.

In some embodiments, a "service execution" conversation-element may provide functionality for storing a response object that is returned from an API call. Said return object may be stored in a variable specified by a service execution conversation-element (see below) and may be named in accordance with a name provided by a creator of the conversation model. In some embodiments, a user creating the conversation model (e.g., a modeler) may also specify, via one or more fields of a "service execution" conversation-element, an endpoint name and any parameters required to call said API, which may be specified in JSON format.

In some embodiments, an endpoint name may be specified according to function. In some embodiment, information such as URL and necessary security tokens may be configured on a storage component for secure tokens used to authenticate one or more downstream systems. In some embodiments, in order to call an API from a conversation model, the API must be wrapped in a class that is supported by the engine executing the conversation model, and the API must be registered on a database that stores metadata about the API such as URL, required parameters to be passed, and/or secure token type.

In some embodiments, a "service execution" conversation-element may contain an "endpoint" field. An "endpoint" field may indicate an endpoint of the service call to be made.

In some embodiments, a "service execution" conversation-element may contain a "return variable" field. A "return variable" field may serve as a wrapper around a return object/value sent back from a service call made. The "return variable" field may allow the creator of a conversation model to designate a name for a variable that may be referenced by one or more other functionalities within the conversation model. Values may be extracted from the wrapper and return object, for example by using dot notation to retrieve specific values out of a result set. In some embodiments, the variable value may be used throughout the conversation model.

In some embodiments, a "service execution" conversation-element may contain a "parameters" field for defining one or more parameters required for executing a particular service. In some embodiments, a "parameters" field may comprise one or more values required for execution of API calls. Required parameters may vary in accordance with the associated service being provided, and required parameters may be defined by a user or system that defines characteristics of the service being provided. For example, a service configured to request weather information may require a location parameter such as a ZIP code or which weather information is to be accessed; a service configured to schedule a meeting may require a date range parameter, a time range parameter, and/or a parameter defining one or more meeting participants; and a service configured to look up office holidays may require a parameter defining a national holiday calendar that is observed by the office.

In some embodiments, values for a "parameters" field may be provided in JSON format. Below is an example of an exemplary value in a "parameters" field for an action for retrieving contact information:

{
"action": "gSuite_getContactInfo",
"contactName": person
"email": commonDataModel.user.profileData.email
}

In some embodiments, a "service execution" conversation-element may contain a "Script (Before Service)" field. A "Script (Before Service)" field may accept code/script (e.g., JavaScript code) to be executed before a call to a service is made. In some embodiments, any variables defined in the conversation model may be referenced in the script. Additionally, this script may be used to modify any data received from the channel prior to sending it to the service call. This functionality may increase flexibility by allowing the conversation model to augment data prior to sending it to the service without creating a separate script execution element.

In some embodiments, a "service execution" conversation-element may contain a "Script (After Service)" field. A "Script (After Service)" field may accept code/script (e.g., JavaScript code) to be executed after a call to a service is made. In some embodiments, any variables defined in the conversation model and/or any values returned by the service may be referenced in the script, for example to further manipulate the data as the conversation model progresses. This functionality may increase flexibility by allowing the conversation model to further manipulate and/or format data prior to sending said data to the channel or to a next step in the conversation model.

6. Conditional Flow

In some embodiments, a "conditional flow" conversation-element may provide functionality to connect conversation-elements, to define the direction of the flow of the conversation model, and to (optionally) define one or more necessary conditions for the conversation model to flow (e.g., progress) from one element to the next.

In some embodiments, a "conditional flow" conversation-element may comprise one or more condition statements that may express a condition that must be satisfied for the conversation model to proceed to flow through the conditional flow element. For example, if the one or more necessary conditions are met (when evaluated during execution of the conversation model), then the conversation model may proceed to a next conversation-element in the flow; conversely, if the one or more necessary conditions are not met, and no valid flow paths are available, then the system executing the conversation model may return an error; lastly, if a "conditional flow" conversation-element contains no condition statement, then the element may default to evaluating as true and the conversation model may proceed to a next conversation-element in the flow.

In some embodiments, a "conditional flow" conversation-element may indicate a direction of flow between conversation-elements in a conversation model in accordance with placement by a user of opposite ends of an arrow graphically representing the "conditional flow" conversation-element, such that the conversation model may flow from one conversation-element to the next in accordance with the direction indicated by the arrow in the graphical representation of the conversation model.

In some embodiments the flow indicators 208a-e shown above in FIGS. 2A-2D represent "conditional flow" conversation-elements. In some embodiments, all flow indicators in a graphical representation of a conversation model may be considered as representations of "conditional flow" conversation-elements, wherein some of said "conditional flow" conversation-elements may have no condition statement and therefore always evaluate as true and always allow the conversation model to flow to the indicated downstream element.

In some embodiments, a condition statement may comprise Boolean logic, JavaScript IF statement syntax, and/or one or more other programming languages or computer code expressing a conditional statement.

In some embodiments, if a "conditional flow" conversation-element proceeds out of a "decision gateway" conversation-element (see below), then the condition field of the "conditional flow" conversation-element must be populated with a condition statement and the order field of the "conditional flow" conversation-element must be populated to indicate the order of evaluation. In some embodiments, if the "conditional flow" conversation-element does not output from a "decision gateway" conversation-element, then the condition statement may be defaulted to true during creation of the conversation model.

In some embodiments, a "conditional flow" conversation-element may contain a "condition" field. A "condition" field may allow a modeler creating the conversation model to input a condition statement to be evaluated to determine whether the conversation model flow should proceed during execution. In some embodiments, condition statements may be evaluated as JavaScript IF statements on the platform. In some embodiments, one or more values from responses of the service calls, values in the common data model, values received or determined during runtime, system entity or context valued, and/or end-user input values may be used in a condition statement. In some embodiments, the condition field may be required and it may be defaulted to a value of true. In some embodiments, all condition statements must evaluate to true or false.

Below is an example of a condition statement that may be checked at a gateway:

varName.records.length==0

In some embodiments, a "conditional flow" conversation-element may contain an "order" field. An "order" field may accept an indication from the creator of the conversation model regarding an order in which multiple flow options diverging from a single element (e.g., a gateway element) should be evaluated. In some embodiments, the indication or order may be a numeric value, such that the conversation model may execute flows in ascending numerical order. In some embodiments, if no order is specified, the various available flow options may be evaluated in random order and the first true option may be executed.

7. Decision Gateway

In some embodiments, a "decision gateway" conversation-element may provide functionality for a decision point, e.g., a branching point, along the flow of the conversation model. In some embodiments, a "decision gateway" conversation-element may be the only conversation-element type in a conversation modeling system that is permitted to have multiple outlets (e.g., multiple downstream flow paths for the conversation model).

In some embodiments, the logic for proceeding, during execution of the conversation model, from a "decision gateway" conversation-element may be dictated by the logic enforced by the two or more "conditional flow" conversation-elements flowing from the "decision gateway" conversation-element. As explained above, "conditional flow" conversation-elements may comprise data for enforcing a condition for proceeding along the indicated path, and may further comprise data for enforcing an order of evaluation of multiple conditional flow options. In the case of a "decision gateway" conversation-element with multiple "conditional flow" conversation-elements stemming therefrom, the different conditions may be evaluated in the order indicated by the order fields of the "conditional flow" conversation-elements (e.g., evaluating conditions in increasing numerical order), with the conversation model proceeding along the flow path associated with the first condition that is evaluated as true.

In some embodiments, generating the conversation model may comprise validating a "decision gateway" conversation-element to ensure that there are no logically inconsistent data in order fields (e.g., duplicate order numbers) of "conditional flow" conversation-elements stemming from the "decision gateway" conversation-element.

In some embodiments, a "decision gateway" conversation-element may be graphically represented as a diamond (see, e.g., graphical conversation-element object 206*d* in FIG. 2D) in a graphical representation of a conversation model in interface 200. In some embodiments, a condition for the conversation model to flow (e.g., proceed) along a particular path/branch may be described on a label of the sequence flow for which it represents. In some embodiments, the language displayed on the label may be a human-friendly (e.g., human-readable) identifier of the process flow for the respective conditional branch.

In some embodiments, a "decision gateway" conversation-element may include no fields that are particular to the conversation-element type. (In some embodiments, a "decision gateway" conversation-element may nonetheless include one or more fields that may be common to some or all conversation-element types, such as a "title" field for accepting a title from the modeler to be displayed on the associated graphical conversation-element object on the canvas region of the conversation modeling graphical user interface.)

8. Script Execution

In some embodiments, a "script execution" conversation-element may provide functionality for executing script or code (e.g., JavaScript) at any point in a conversation model. In some embodiments, a "script execution" conversation-element may be used to perform data mapping and/or formatting of data to be sent to the channel for display during execution of the conversation model.

In some embodiments, a "script execution" conversation-element may contain a "script" field. A "script" field may accept code/script (e.g., JavaScript code) to be executed as part of executing the conversation model. In some embodiments, the code and/or script provided to the "Script" field may reference any global variable, any system entity or context variables, any local-level variable, and/or any response variable that has been instantiated so far in the conversation model flow.

In some embodiments, a "script execution" conversation-element may provide functionality for causing the conversation to execute an embedded conversation. An embedded conversation may be any conversation that is contained (e.g., embedded, nested, etc.) within another conversation. In some embodiments, the code and/or script provided to the "Script" field may be configured to cause the system to call or otherwise execute an embedded conversation model.

9. Sub-Process

In some embodiments, a "sub-process" conversation-element may provide functionality for one conversation to leverage another conversation as a sub-process nested within the top-level conversation. Nesting one conversation within another may improve efficiencies when the one or the conversations is edited in a manner that does not directly affect the other. In some embodiments, a top-level conversation may call a lower-level conversation and the result of the lower-level conversation may be returned to the top-level conversation as an output. For example, a top-level conversation may call a lower-level conversation to perform a person disambiguation function; in this example, the top-level conversation may provide input to the lower-level conversation comprising a personal name to be disambiguated, and the lower-level conversation may then return to the top-level conversation a specific identifier of a disambiguated person associated with the name provided. In some embodiments, "sub-process" conversation-elements may provide functionality for chaining conversation models within a flow, for example by indicating that a conversation model includes one or more outside dependencies. A "sub-process" conversation-elements may represent a conversation within a conversation.

In some embodiments, a "sub-process" conversation-element may be provided in one or two types: collapsed or expanded. The distinction between an expanded and collapsed sub-process element may be the manner in which the "sub-process" conversation-element is represented in an interface. In some embodiments, a collapsed "sub-process" conversation-element may be denoted by an icon or other indicator displayed on a graphical representation of another conversation-element, such as a plus sign on or near the bottom corner of a graphical conversation-element object, such as those shown in FIG. 2D. In some embodiments, an expanded "sub-process" conversation-element may display one or more nested conversation-elements that any other conversation may contain.

In some embodiments, a "sub-process" conversation-element may contain an "intent ID" field. An "intent ID" field may comprise a unique identifier (e.g., an intent ID) for the conversation model that is being called by the sub-process. Creators of conversation models may be required by the conversation modeling system to provide unique intent ID's to identify each new conversation model, thereby ensuring that conversation models are able to call one another via their respective unique ID's.

In some embodiments, a "sub-process" conversation-element may contain an "inputs" field. An "inputs" field may accept values to be used for mapping variables in the calling conversation model to global variables in the separate conversation model being called. In some embodiments, said values may be accepted in JSON format.

In the example below, the key (which is on the left side of the colon) of JSON is the same name as a global variable defined in the conversation model being called, and the value (which is on the right side of the colon) is mapped to the variables or string literals in the calling conversation.
{
"client": client
}

In some embodiments, a "sub-process" conversation-element may contain an "output variable" field. An "output variable" field may accept data used to map a returned object to a variable, similar to a "response variable" field of a "user input" conversation-element as described above. In some embodiments, an "output variable" field may define a value that may be an existing variable name or a new variable name of the modeler's choosing.

Exemplary Conversation Modeling Methods

Figure 3:
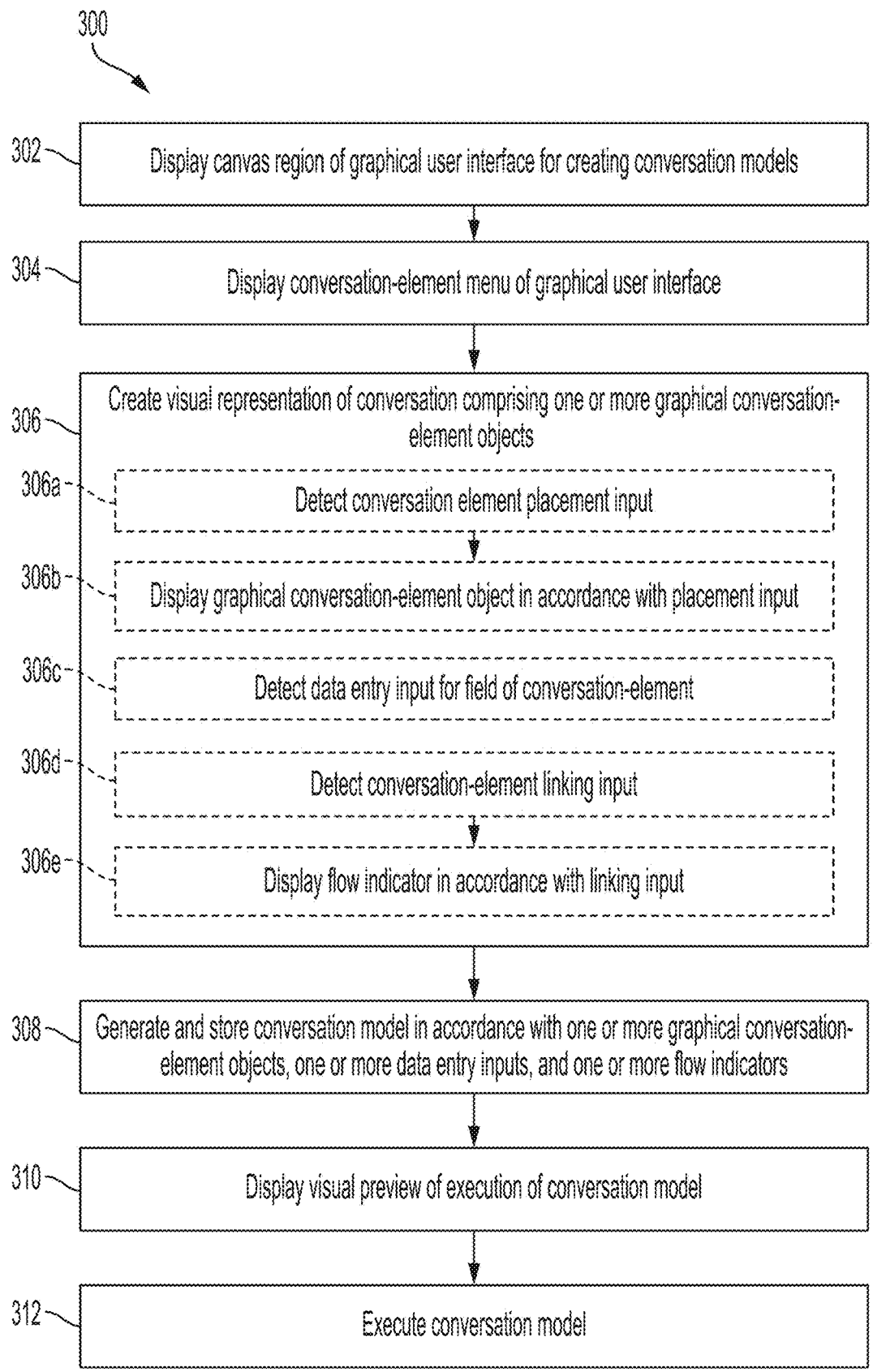
FIG. 3 depicts a method for conversation modeling, in accordance with some embodiment.

FIG. 3 depicts a flow chart showing an exemplary method 300 for conversation modeling, in accordance with some embodiments. In some embodiments, method 300 may be performed by a system for conversation modeling such as system 100 described above with reference to FIG. 1. In some embodiments, the method steps of method 300 may be performed by a conversation modeling system that is communicatively coupled to and/or otherwise provided in association with a model creator system (such as system 150 described above with reference to FIG. 1) and/or a conversation model deployment system (such as system 160 described above with reference to FIG. 1). Exemplary steps of method 300 are described below.

At block 302, in some embodiments, the system may display a canvas region of a graphical user interface for creating conversation models. In some embodiments, a canvas region of a graphical user interface for creating conversation models may comprise any region on which one or more graphical user interface object may be displayed, placed, manipulated, positioned, and/or otherwise manipulated in order to form a graphical visual representation model of a conversation model. In some embodiments, a canvas region may be a region of a graphical user interface onto which a user may be able to drag-and-drop one or more graphical user interface elements representing conversation-elements. In some embodiments, objects that may be placed on or otherwise displayed on a canvas region of a conversation modeling interface may include graphical objects representing conversation-elements and/or graphical elements representing relationships (e.g., links) between two or more conversation-elements.

In the example of FIGS. 2A-2D, system 100 may display canvas region 202 as part of graphical user interface 200.

At block 304, in some embodiments, the system may display a conversation-element menu of the graphical user interface for creating conversation models. A conversation-element menu may be any graphical user interface menu displaying one or more options for selecting a conversation-element to be placed on the canvas region. In some embodiments, the conversation-element menu may display a plurality of options for adding various different types of conversation-elements (as described herein) to the canvas region. In some embodiments, a user may be able to indicate a selected option from the conversation-element menu and subsequently cause a conversation-element corresponding to said selection to be placed on the canvas region. In some embodiments, a conversation-element may be automatically populated onto the canvas region in response to a user selecting an option from the menu, or a user may drag and drop an element from the menu to a selected location on the canvas region.

In the example of FIGS. 2A-2D, system 100 may display conversation-element menu 204 as part of graphical user interface 200.

At block 306, in some embodiments, the system may create and display a visual representation of a conversation, the visual representation comprising one or more graphical conversation-element objects. As described in additional detail below, the system may create a visual representation of a conversation by displaying a plurality of graphical conversation-element objects on the canvas region and by displaying visual indicators of relationships (e.g., links) between two or more of the displayed objects. In this way, the flow of a conversation from start (e.g., utterance triggering the conversation to be executed) to finish may be mapped in a visual manner that represents the relationships of the various aspects of the conversation as represented by different conversation-elements. A user of the modeling interface may be able to understand the flow of the conversation by observing the visual representation on the canvas region, and may thus be able to design and configure a conversation model by inserting conversation-elements, deleting conversation-elements, configuring conversation-elements (e.g., by providing data to one or more fields associated with an element), rearranging conversation-elements, and/or defining one or more relationships (e.g., links defining conversational flow) between pairs or sets of conversation-elements by inserting, configuring, and/or removing links between various graphical conversation-element objects in the visual representation.

In the example of FIG. 2D, a visual representation of a conversation model having various conversation-elements and various links amongst said conversation-elements is shown on canvas region 202 of interface screen 200d.

Various aspects of creating the visual representation of a conversation are discussed below with respect to blocks 306a-e.

At block 306a, in some embodiments, creating the visual representation of the conversation may comprise detecting a conversation-element placement input. A conversation-element placement input may comprise any input executed by a user of the graphical user interface directing the system to place a graphical conversation-element object on the canvas region on the graphical user interface. In some embodiments, the placement input may comprise instructions to place a new object on the canvas region; in some embodiments, the input may comprise instructions to reposition an object that is already placed on the canvas region. In some embodiments, the input may comprise instructions regarding a location on the region at which the object should be placed. In some embodiments, the input may comprise a drag-and-drop input by which a user of the interface may drag a graphical conversation-element object from the conversation-element menu to a desired location on the canvas region of the interface. In some embodiments, the placement input may include an indication of a type of conversation-element to be represented by the object placed on the canvas region; for example, a user of the interface may drag from (or otherwise specify) a specific region of the conversation-element menu in order to select a desired type of conversation-element.

At block 306b, in some embodiments, creating the visual representation of the conversation may comprise displaying a graphical conversation-element object in accordance with the placement input. In some embodiments, displaying the graphical conversation-element object in accordance with the placement input may comprise displaying the conversation-element object having a type (e.g., start conversation, user input, response, end conversation, etc.) as indicated by the placement input.

In some embodiments, the type of conversation-element corresponding to the graphical conversation-element object displayed on the canvas region may be used by the system to generate and store a conversation model in accordance with the visual representation of the conversation model displayed on the canvas region. For example, certain functionalities for executing a conversation may be associated with different conversation types. In some embodiments, instructions regarding the one or more associated functionalities may be generated and stored as part of the conversation model in accordance with the type of graphical conversation-element object displayed on the canvas region. For example:

in accordance with the graphical conversation-element object representing a "start conversation" conversation-element, the system may generate and store instructions to initiate execution of a conversation model;
  in accordance with the graphical conversation-element object representing an "end conversation" conversation-element, the system may generate and store instructions to finalize execution of a conversation model;
  in accordance with the graphical conversation-element object representing a "user input" conversation-element, the system may generate and store instructions to receive input during execution of a conversation model;
  in accordance with the graphical conversation-element object representing a "response" conversation-element, the system may generate and store instructions to receive provide output/response data during execution of a conversation model;
  in accordance with the graphical conversation-element object representing a "service execution" conversation-element, the system may generate and store instructions to call one or more APIs during execution of a conversation model;
  in accordance with the graphical conversation-element object representing a "conditional flow" conversation-element, the system may generate and store instructions to execute a subsequent step, during execution of the conversation model, in accordance with one or more predefined conditions being satisfied;
  in accordance with the graphical conversation-element object representing a "script execution" conversation-element, the system may generate and store instructions to execute script during execution of a conversation model; and/or
  in accordance with the graphical conversation-element object representing a "sub-process" conversation-element, the system may generate and store instructions to associate the conversation with one or more embedded conversations.

In some embodiments, displaying the graphical conversation-element object in accordance with the placement input may comprise displaying the graphical-element object at a location on the canvas region indicated by the placement input, such as a location to which a user drags and drops the object or a location at which a user clicks or taps on the canvas region.

At block 306c, in some embodiments, creating the visual representation of the conversation may comprise detecting data entry input for a field associated with the displayed graphical conversation-element object. In some embodiments, the system may be configured to display one or more data entry fields corresponding to a graphical conversation-element object that has been placed on the canvas region. In some embodiments, in response to a user placing a graphical conversation-element object on the canvas region (and/or in response to a user otherwise indicating selection of such an object on the canvas region), the system may automatically display one or more fields configured to accept data entry input(s) from the user of the modeling interface.

In some embodiments, data entered by the data entry input(s) may be stored in associated with the graphical conversation-element object and eventually used in generating the conversation model itself. In some embodiments, different conversation-element types may comprise different sets of one or more fields into which a user may be required to enter data and/or into which a user may optionally enter data. In some embodiments, data entered by a user may include a title for a conversation-element, one or more utterances to be associated with a conversation-element, a response type to be associated with a conversation-element, an image to be associated with a conversation-element, a URL to be associated with a conversation-element, and/or information regarding one or more actions to be associated with a conversation-element.

In some embodiments, data entry input(s) of data to specify information about a conversation-element (e.g. to specify information about one or more fields of a conversation-element) may be input into a conversation-element fields window such as window 220 in FIG. 2B or 230 in FIG. 2C.

In some embodiments, data entry input(s) may be entered via one or more field interface objects (e.g., buttons, drop-down menus, text entry fields, etc.) for specifying information about a conversation-element (or a plurality of conversation-elements) associated with the window. In some embodiments, data entry input(s) of data to specify information about a conversation-element may be used to update the corresponding displayed graphical conversation-element object in the canvas region (e.g., by updating a displayed title, displayed associated utterances, or other displayed associated information.

In some embodiments, data entry input(s) may be used by the system to generate and store the conversation model based on the displayed visual representation. That is, the data entered may be used to configure one or more functionalities of the conversation. In some embodiments, data entry input(s) may indicate:
 a conversation-element type;
 an utterance
 an output value
 a schema name
 a response variable
 a response type
 an endpoint
 a return variable
 a parameter
 executable script;
 a condition; and/or
 an order for a condition.

Any one or more of the above data types, after being inputted to the conversation modeling system by a user of the conversation modeling interface, may be used by the system as described herein to configure functionality of one or more conversation-elements (e.g., as described above with respect to the exemplary conversation model conversation-element types).

At block 306d, in some embodiments, creating the visual representation of the conversation may comprise detecting a conversation-element linking input. A linking input may be any input configured to specify an order (or other relationship) of a plurality of conversation-elements with respect to one another. Thus, linking inputs may be used to link together a plurality of conversation-elements and to thereby define a conversation flow from one or more "start conversation" conversation-elements toward and to one or more "end conversation" conversation-elements. During execution of the conversation model based on the visual representation created by the modeling interface, the conversation may proceed chronologically in accordance with the flow (or other relationships) indicated by the one or more linking inputs.

At block 306e, in some embodiments, creating the visual representation of the conversation may comprise displaying a flow indicator in accordance with the linking input. In some embodiments, a flow indicator may comprise an arrow linking two conversation-elements to one another and designating a direction of flow (e.g., which conversation-element occurs earlier in the conversation and which follows after the other). In the example of interface 200 in FIG. 2A, link indicator 208 is a flow indicator showing that the conversation represented progresses from conversation-element 206a to conversation-element 206b.

At block 308, in some embodiments, the system may generate and store a conversation model in accordance with one or more graphical conversation-element objects, one or more data entry inputs, and/or one or more flow indicators created and/or displayed in accordance with the steps above.

Generating and storing the conversation model in accordance with the one or more graphical conversation-element objects may comprise generating instructions as part of the conversation model that are associated with the conversation-element type(s) represented by the various graphical conversation-element objects.

Generating and storing the conversation model in accordance with the one or more data entry inputs may comprise generating instructions as part of the conversation model such that one or more functionalities of the conversation are configured in accordance with the inputted data, for example as described above with respect to the exemplary conversation model conversation-element types. For example, a data entry input may define or more utterances to trigger execution of a conversation, a type of input to prompt an end-user to provide during the conversation, content to be provided in response to an end-user during execution of a conversation, information regarding one or more APIs or other services to be accessed or utilized during execution of the conversation, one or more parameters or thresholds for a condition to be assessed during execution of the conversation, an order for a plurality of conditions to be assessed during execution of the conversation, information regarding one or more scripts to be executed during execution of the conversation, and/or information regarding one or more sub-processes (e.g., associated conversations) to be accessed or called or executed during execution of the conversation.

Generating and storing the conversation model in accordance with the one or more flow indicators may comprise generating instructions as part of the conversation model such that functionalities associated with the various conversation-elements of the conversation are executed by the conversation model in the order (e.g., the chronological order and logical relationship) depicted by the visual representation of the conversation on the canvas region of the graphical user interface.

In some embodiments, generating and storing the conversation model may comprise generating and storing executable instructions that may be executed by a system (e.g., a business intelligence system, intelligent assistant system, NLU system, or the like) in order to execute the conversation. In some embodiments, the conversation model may be stored locally and/or transmitted to one or more associated systems or storage mediums for local or remote storage.

At block 310, in some embodiments, the system may display a visual preview of execution of the conversation model. In some embodiments, displaying a visual preview of execution of the conversation model may comprise displaying a simulation or other representation of one or more graphical user interfaces that would be displayed during execution of the conversation model by an end-user on the end-user's device. In the example of conversation modeling system 100 in FIG. 1, system 100 may display a visual preview or simulation (e.g., via conversation model creator system 150) of an interface that would be seen by an end user of the conversation model following deployment and execution of the conversation model. In some embodiments, visual preview functionality may demonstrate how the conversation model will perform without deploying the conversation model to a final platform. This may shorten development cycles and enable modelers to make adjustments on the fly without committing changes that have yet to be thoroughly vetted.

At block 312, in some embodiments, the system may execute the conversation model. In some embodiments, execution of the conversation model may be performed by the same system that was used to create the conversation model (e.g., conversation modeling system 100) or by a different system, such as by conversation model deployment system 160 in FIG. 1. In some embodiments, a device associated with an end-user of the conversation model may be used to display one or more graphical user interfaces of the conversation model during execution of the conversation model in association with one or more back-end servers, processors, databases, and the like used to provide and execute the various functionalities of the conversation model.

In some embodiments, a conversation modeling system may be configured to accept input from a user of the conversation modeling system that specifies key input indicating a key to be uniquely associated with a conversation model being created. In some embodiments, the system may be configured to verify that the key is unique amongst a set of other respective keys for a set of other conversation models. In some embodiments, each conversation model in a system may be required to be associated with a unique key that may be used to identify each unique conversation model.

In some embodiments, a conversation modeling system may be configured to validate data for a conversation model being created. In some embodiments, validating data may comprise validating that a key identifying the model is unique amongst a set of keys. In some embodiments, validating data may comprise validating that data entered by a user into a field for a conversation-element of the model satisfied predefined criteria (e.g., criteria for data type, for acceptable data values, etc.). In some embodiments, validating data may comprise validating that the conversation model does not include an impermissible overlap of an utterance with another conversation model. In some embodiments, validating to prevent impermissible overlap of utterances may allow for intelligent assistant and/or NLU systems to be effectively applied in corporate network environments in which there is a higher likelihood of overlapping utterances than in NLU applications for general-purpose intelligent assistants.

In some embodiments, a conversation modeling system may be configured to accept input from a user of the conversation modeling system that specifies versioning information regarding one or more conversation models being created. In some embodiments, versioning information may be stored in association with one or more conversation models being created.

In some embodiments, a conversation modeling system may be configured to enforce a business review process to ensure that the conversation model conforms with an enterprise requirement. In some embodiments, automated enforcement of one or more business review processes may ensure that the conversation model being created complies with one or more enterprise requirements. In some embodiments, automated enforcement of one or more business review processes ensure that the conversation model complied with one or more standardized notations, such as Business Process Model Notation 2.0. In some embodiments, one or more business review processes may include an automated publishing step, such that a conversation model may be published automatically upon determination that the conversation model complies with one or more predefined business review requirements.

Exemplary Computer

Figure 4:
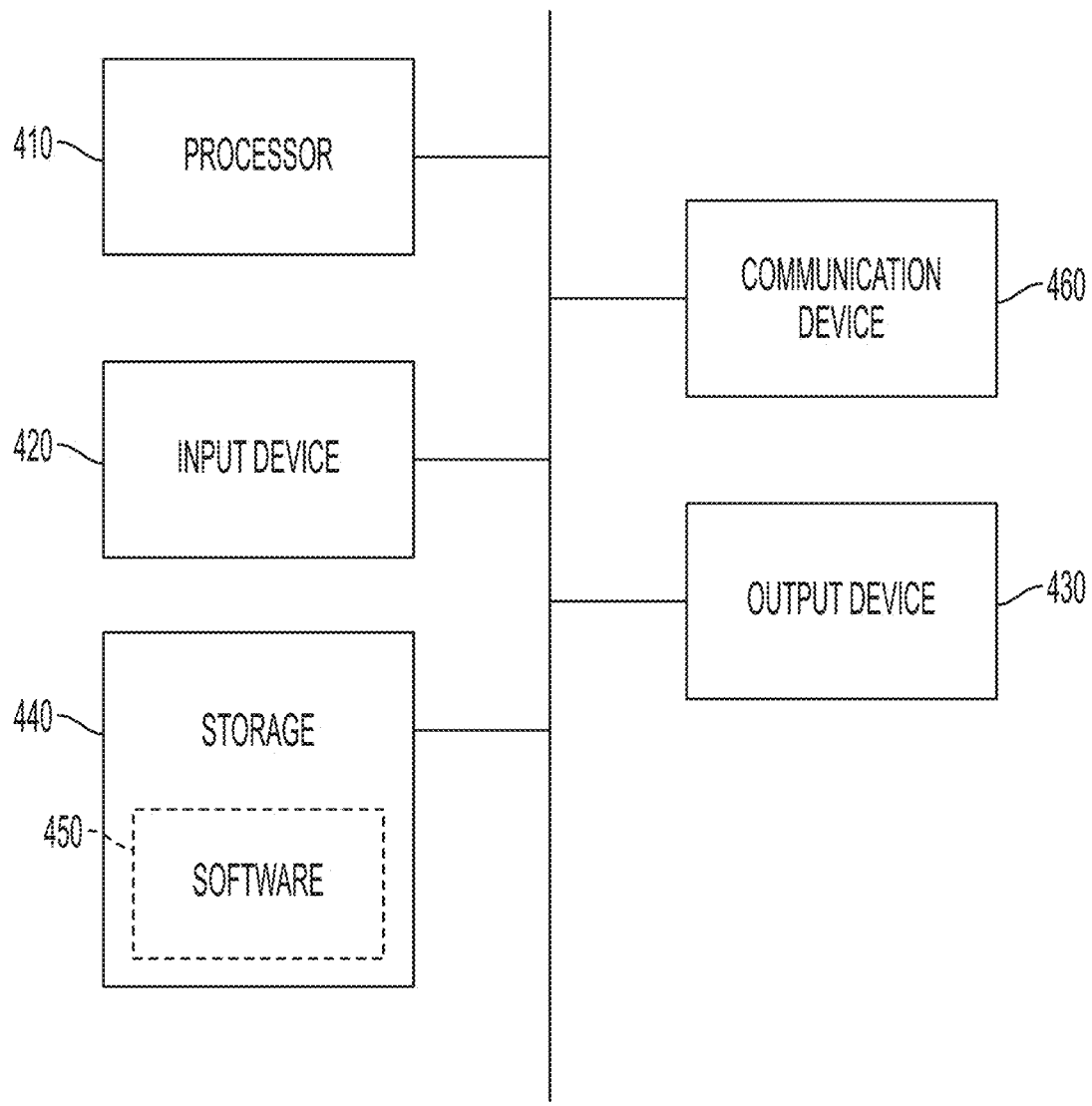
FIG. 4 depicts a computing system, in accordance with some embodiments.

FIG. 4 illustrates a computer, in accordance with some embodiments. Computer 400 can be a component of a system for optimizing cooperative actions among heterogeneous autonomous connected machines, such as system 100 and/or any of its subcomponents described above with respect to FIG. 1. In some embodiments, computer 400 may be configured to execute a method for conversation modeling, such as all or part of method 300 described above with respect to FIG. 3.

Computer 400 can be a host computer connected to a network. Computer 400 can be a client computer or a server. As shown in FIG. 4, computer 400 can be any suitable type of microprocessor-based device, such as a personal computer; workstation; server; or handheld computing device, such as a phone or tablet. The computer can include, for example, one or more of processor 410, input device 420, output device 430, storage 440, and communication device 460.

Input device 420 can be any suitable device that provides input, such as a touch screen or monitor, keyboard, mouse, or voice-recognition device. Output device 430 can be any suitable device that provides output, such as a touch screen, monitor, printer, disk drive, or speaker.

Storage 440 can be any suitable device that provides storage, such as an electrical, magnetic, or optical memory, including a RAM, cache, hard drive, CD-ROM drive, tape drive, or removable storage disk. Communication device 460 can include any suitable device capable of transmitting and receiving signals over a network, such as a network interface chip or card. The components of the computer can be connected in any suitable manner, such as via a physical bus or wirelessly. Storage 440 can be a non-transitory computer-readable storage medium comprising one or more programs, which, when executed by one or more processors, such as processor 410, cause the one or more processors to execute methods described herein, such as all or part of method 300 described above with respect to FIG. 3.

Software 450, which can be stored in storage 440 and executed by processor 410, can include, for example, the programming that embodies the functionality of the present disclosure (e.g., as embodied in the systems, computers, servers, and/or devices as described above). In some embodiments, software 450 can be implemented and executed on a combination of servers such as application servers and database servers.

Software 450 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 400 can implement any operating system suitable for operating on the network. Software 450 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A modeling system for creating interactive conversation models for use by an intelligent assistant system, the modeling system comprising one or more processors, one or more displays, and memory storing instructions configured to be executed by the one or more processors to cause the modeling system to:
　display a canvas region of a graphical user interface for creating conversation models;
　display a conversation-element menu comprising a plurality of graphical conversation-element menu objects each representing a respective conversation-element type;
　create a visual representation of a conversation, the visual representation comprising one or more graphical conversation-element objects, wherein creating the visual representation comprises:
　　detecting a conversation-element placement input from a user, wherein the input comprises selection of one of the conversation-element menu objects and indication of a location on the canvas region; and
　　in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object;
　in response to detecting the conversation-element placement input, display a conversation-element fields menu separate from the canvas region, wherein the conversation-element fields menu comprises one or more field portions prompting the user to enter condition information for a first condition of a plurality of conditions, wherein the first condition is associated with the conversation-element, and to enter evaluation order information specifying a position of the first condition in an evaluation order in which the plurality of conditions are arranged;
　detect a data entry input for the one or more field portions of the conversation-element, wherein the data entry input indicates the first condition;
　determine whether the data entry input indicates the position of the first condition in the evaluation order in which the plurality of conditions are arranged;
　in accordance with a determination that the data entry input indicates the position of the first condition in the evaluation order, generate and store a model of the conversation in accordance with the one or more graphical conversation-element objects of the visual representation of the conversation and based at least in part on the data entry input indicating the first condition and indicating the position of the first condition in the evaluation order, such that the conversation model is configured to evaluate the first condition associated with the conversation-element in accordance with the evaluation order information specifying the position of the first condition in the evaluation order in which the plurality of conditions are arranged; and
　in accordance with a determination that the data entry input does not indicate the position of the first condition in the evaluation order, generate and store the model of the conversation in accordance with the one or more graphical conversation-element objects of the visual representation of the conversation and based at least in part on the data entry input indicating the first condition, such that the conversation model is configured to evaluate the plurality of conditions in a random order.

2. The modeling system of claim 1, wherein creating the visual representation of the conversation further comprises:
　detecting a conversation-element linking input from a user indicating an association within the conversation between two conversation-elements represented by two graphical conversation-element objects of the visual representation of the conversation;
　in response to detecting the conversation-element linking input, displaying a flow indicator on the canvas region indicating an association between the two graphical conversation-element objects.

3. The modeling system of claim 2, wherein generating and storing a model of the conversation in accordance with the one or more graphical conversation-element objects of the visual representation comprises generating and storing the model in accordance with the flow indicator.

4. The modeling system of claim 1, wherein generating and storing the model of the conversation comprises generating and storing, in accordance with the conversation-element type, instructions to initiate execution of the conversation model.

5. The modeling system of claim 1, wherein generating and storing the model of the conversation comprises generating and storing, in accordance with the conversation-element type, instructions to finalize execution of the conversation model.

6. The modeling system of claim 1, wherein generating and storing the model of the conversation comprises generating and storing, in accordance with the conversation-element type, instructions to receive input during execution of the conversation model.

7. The modeling system of claim 1, wherein generating and storing the model of the conversation comprises generating and storing, in accordance with the conversation-element type, instructions to provide output during execution of the conversation model.

8. The modeling system of claim 1, wherein generating and storing the model of the conversation comprises generating and storing, in accordance with the conversation-element type, instructions to call an API during execution of the conversation model.

9. The modeling system of claim 1, wherein generating and storing the model of the conversation comprises generating and storing, in accordance with the conversation-element type, instructions to execute a subsequent step, during execution of the conversation model, in accordance with one or more predefined conditions being satisfied.

10. The modeling system of claim 1, wherein generating and storing the model of the conversation comprises generating and storing, in accordance with the conversation-element type, instructions to execute script during execution of the conversation model.

11. The modeling system of claim 1, wherein generating and storing the model of the conversation comprises generating and storing, in accordance with the conversation-element type, instructions to associate the conversation with an embedded conversation.

12. The modeling system of claim 1, wherein the data entry input indicates an utterance.

13. The modeling system of claim 1, wherein the data entry input indicates an output value.

14. The modeling system of claim 1, wherein the data entry input indicates a schema name.

15. The modeling system of claim 1, wherein data entry input indicates a response variable.

16. The modeling system of claim 1, wherein the data entry input indicates a response type.

17. The modeling system of claim 1, wherein the data entry input indicates an endpoint.

18. The modeling system of claim 1, wherein the data entry input indicates a return variable.

19. The modeling system of claim 1, wherein the data entry input indicates a parameter.

20. The modeling system of claim 1, wherein the data entry input indicates executable script.

21. The modeling system of claim 1, wherein the instructions further cause the modeling system to:
receive a key input from the user indicating a key to be uniquely associated with the model of the conversation; and
verify that the key is unique amongst a set of other respective keys for a set of other conversation models;
wherein generating and storing the model of the conversation is performed in accordance with verifying that the key is unique.

22. The modeling system of claim 1, wherein the instructions further cause the modeling system to:
after generating and storing the model of the conversation, display a visual preview of execution of the conversation model.

23. The modeling system of claim 1, wherein the instructions further cause the modeling system to:
after generating and storing the model of the conversation, execute the conversation model.

24. The modeling system of claim 1, wherein the instructions further cause the modeling system to validate data for the conversation model.

25. The modeling system of claim 24, wherein validating data comprises one or more of validating that a key identifying the model is unique amongst a set of keys, validating that data entered by a user into a field of a conversation-element of the model satisfies predefined criteria, and validating that the model does not include an impermissible overlap of an utterance with another conversation model.

26. The modeling system of claim 1, wherein:
the instructions further cause the modeling system to receive a versioning input from a user; and
generating and storing the model of the conversation comprises storing the model of the conversation with versioning information based on the versioning input.

27. The modeling system of claim 1, wherein the instructions further cause the modeling system to enforce a business review process to ensure that the conversation model conforms with an enterprise requirement.

28. A method for creating interactive conversation models for use by an intelligent assistant system, the method performed by a modeling system comprising one or more processors and one or more displays, the method comprising:
displaying a canvas region of a graphical user interface for creating conversation models;
displaying a conversation-element menu comprising a plurality of graphical conversation-element menu objects each representing a respective conversation-element type;
creating a visual representation of a conversation, the visual representation comprising one or more graphical conversation-element objects, wherein creating the visual representation comprises:
detecting a conversation-element placement input from a user, wherein the input comprises selection of one of the conversation-element menu objects and indication of a location on the canvas region; and
in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object;
in response to detecting the conversation-element placement input, displaying a conversation-element fields menu separate from the canvas region, wherein the conversation-element fields menu comprises one or more field portions prompting the user to enter condition information for a first condition of a plurality of conditions, wherein the first condition is associated with the conversation-element, and to enter evaluation order information specifying a position of the first condition in an evaluation order in which the plurality of conditions are arranged;

detecting a data entry input for the one or more field portions of the conversation-element, wherein the data entry input indicates the first condition;

determining whether the data entry input indicates the position of the first condition in the evaluation order in which the plurality of conditions are arranged;

in accordance with a determination that the data entry input indicates the position of the first condition in the evaluation order, generating and storing a model of the conversation in accordance with the one or more graphical conversation-element objects of the visual representation of the conversation and based at least in part on the data entry input indicating the first condition and indicating the position of the first condition in the evaluation order, such that the conversation model is configured to evaluate the first condition associated with the conversation-element in accordance with the evaluation order information specifying the position of the first condition in the order in which the plurality of conditions are arranged; and in accordance with a determination that the data entry input does not indicate the position of the first condition in the evaluation order, generating and storing the model of the conversation in accordance with the one or more graphical conversation-element objects of the visual representation of the conversation and based at least in part on the data entry input indicating the first condition, such that the conversation model is configured to evaluate the plurality of conditions in a random order.

29. A non-transitory computer-readable storage medium storing instructions for creating interactive conversation models for use by an intelligent assistant system, the instructions configured to be executed by a modeling system comprising one or more processors and one or more displays, the instructions configured to cause the system to:

display a canvas region of a graphical user interface for creating conversation models;

display a conversation-element menu comprising a plurality of graphical conversation-element menu objects each representing a respective conversation-element type;

create a visual representation of a conversation, the visual representation comprising one or more graphical conversation-element objects, wherein creating the visual representation comprises:

detecting a conversation-element placement input from a user, wherein the input comprises selection of one of the conversation-element menu objects and indication of a location on the canvas region; and in response to detecting the conversation-element placement input, displaying, at the indicated location on the canvas region, a graphical conversation-element object within the visual representation of the conversation, wherein the graphical conversation-element object indicates that a conversation-element represented by the graphical conversation-element object is of a conversation-element type corresponding to the selected conversation-element menu object;

in response to detecting the conversation-element placement input, display a conversation-element fields menu separate from the canvas region, wherein the conversation-element fields menu comprises one or more field portions prompting the user to enter condition information for a first condition of a plurality of conditions, wherein the first condition is associated with the conversation-element, and to enter evaluation order information specifying a position of the first condition in an evaluation order in which the plurality of conditions are arranged;

detect a data entry input for the one or more field portions of the conversation-element, wherein the data entry input indicates the first condition;

determine whether the data entry input indicates the position of the first condition in the evaluation order in which the plurality of conditions are arranged;

in accordance with a determination that the data entry input indicates the position of the first condition in the evaluation order, generate and store a model of the conversation in accordance with the one or more graphical conversation-element objects of the visual representation of the conversation and based at least in part on the data entry input indicating the first condition and indicating the position of the first condition in the evaluation order, such that the conversation model is configured to evaluate the first condition associated with the conversation-element in accordance with the evaluation order information specifying the position of the first condition in the order in which the plurality of conditions are arranged; and in accordance with a determination that the data entry input does not indicate the position of the first condition in the evaluation order, generate and store the model of the conversation in accordance with the one or more graphical conversation-element objects of the visual representation of the conversation and based at least in part on the data entry input indicating the first condition, such that the conversation model is configured to evaluate the plurality of conditions in a random order.

* * * * *